May 25, 1937.  E. RACZ  2,081,836
CALCULATING MACHINE
Original Filed Oct. 6, 1932   7 Sheets-Sheet 1
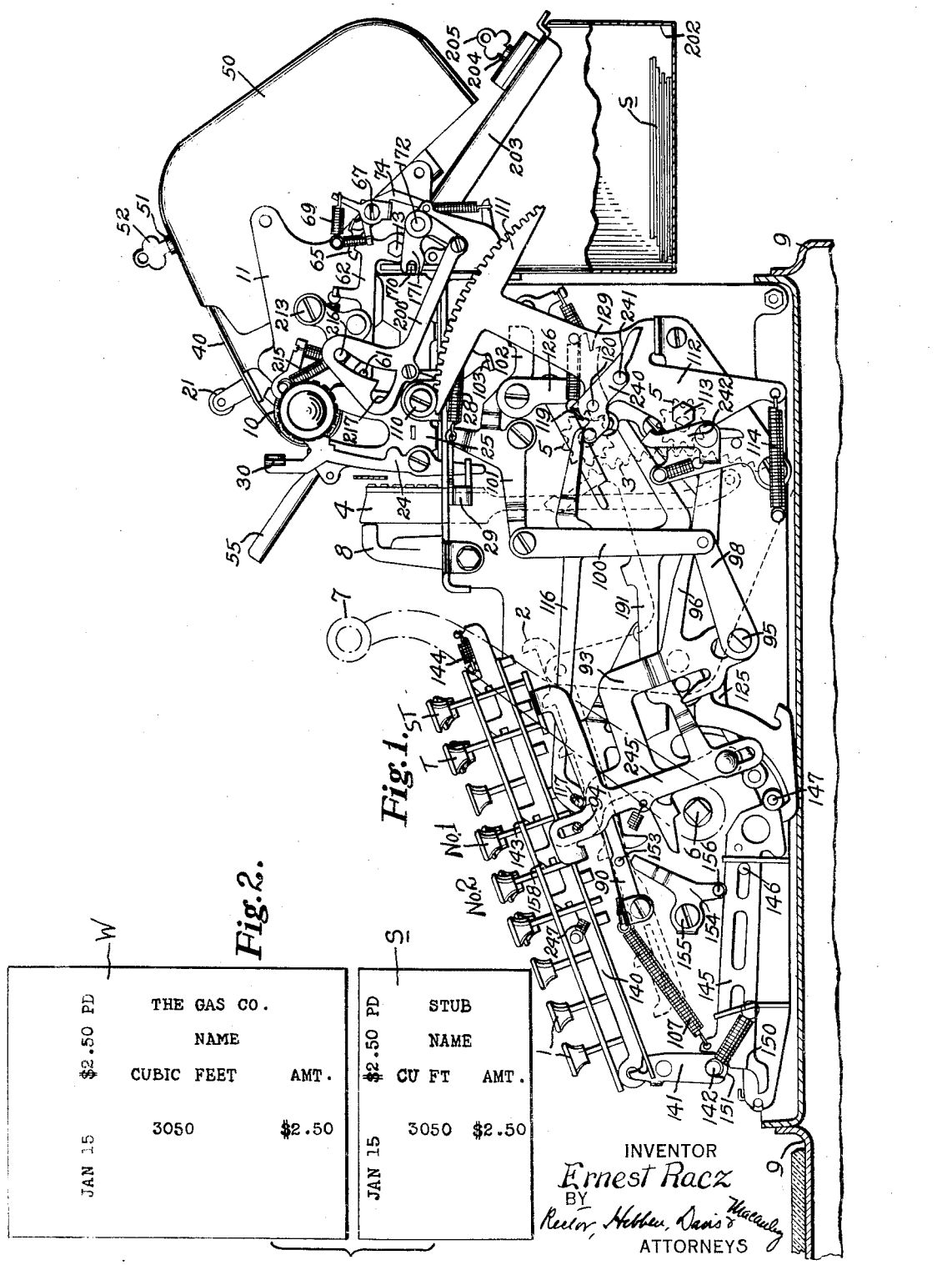
INVENTOR
*Ernest Racz*
BY
ATTORNEYS

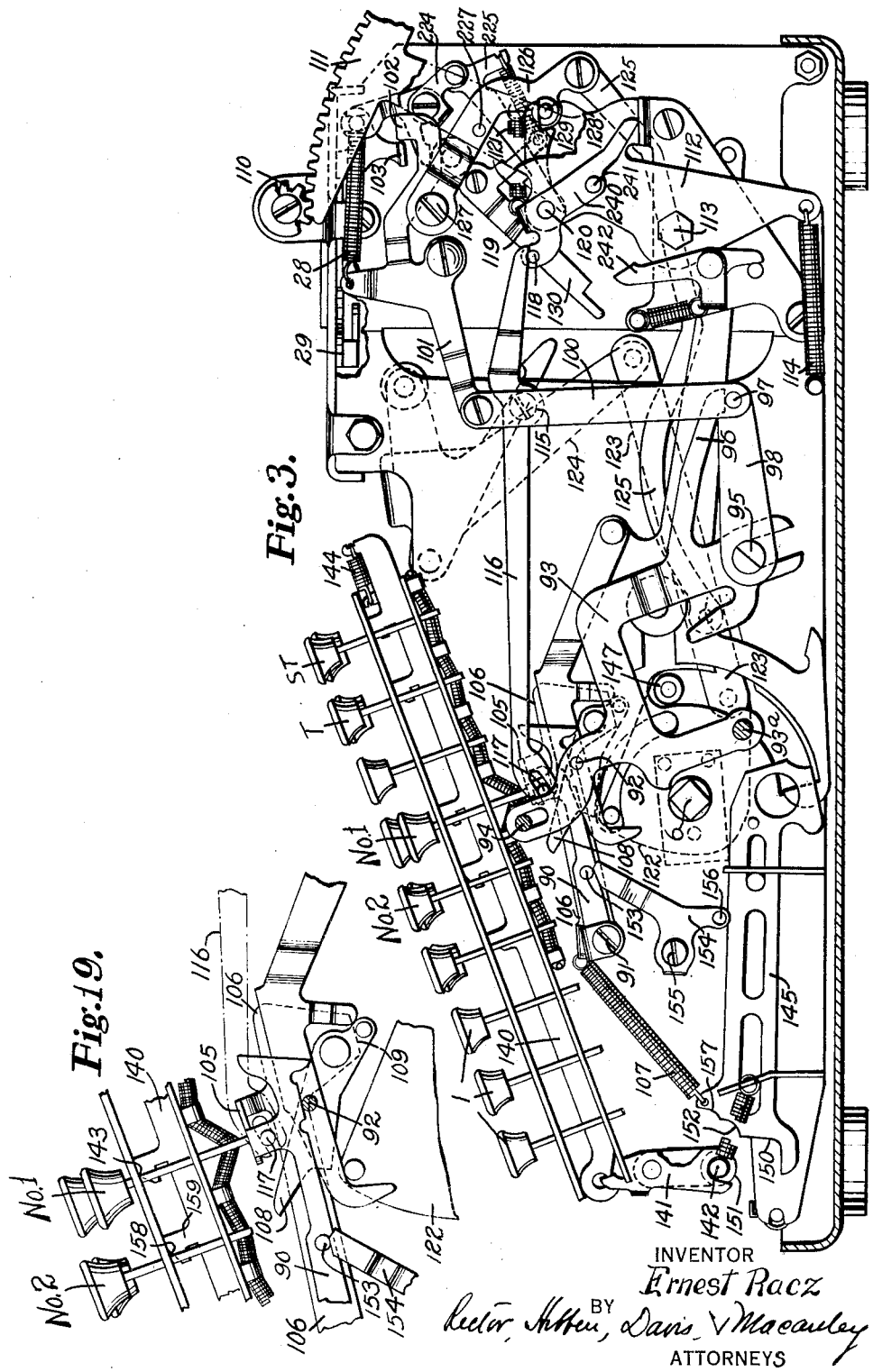

May 25, 1937.  E. RACZ  2,081,836
CALCULATING MACHINE
Original Filed Oct. 6, 1932   7 Sheets-Sheet 3
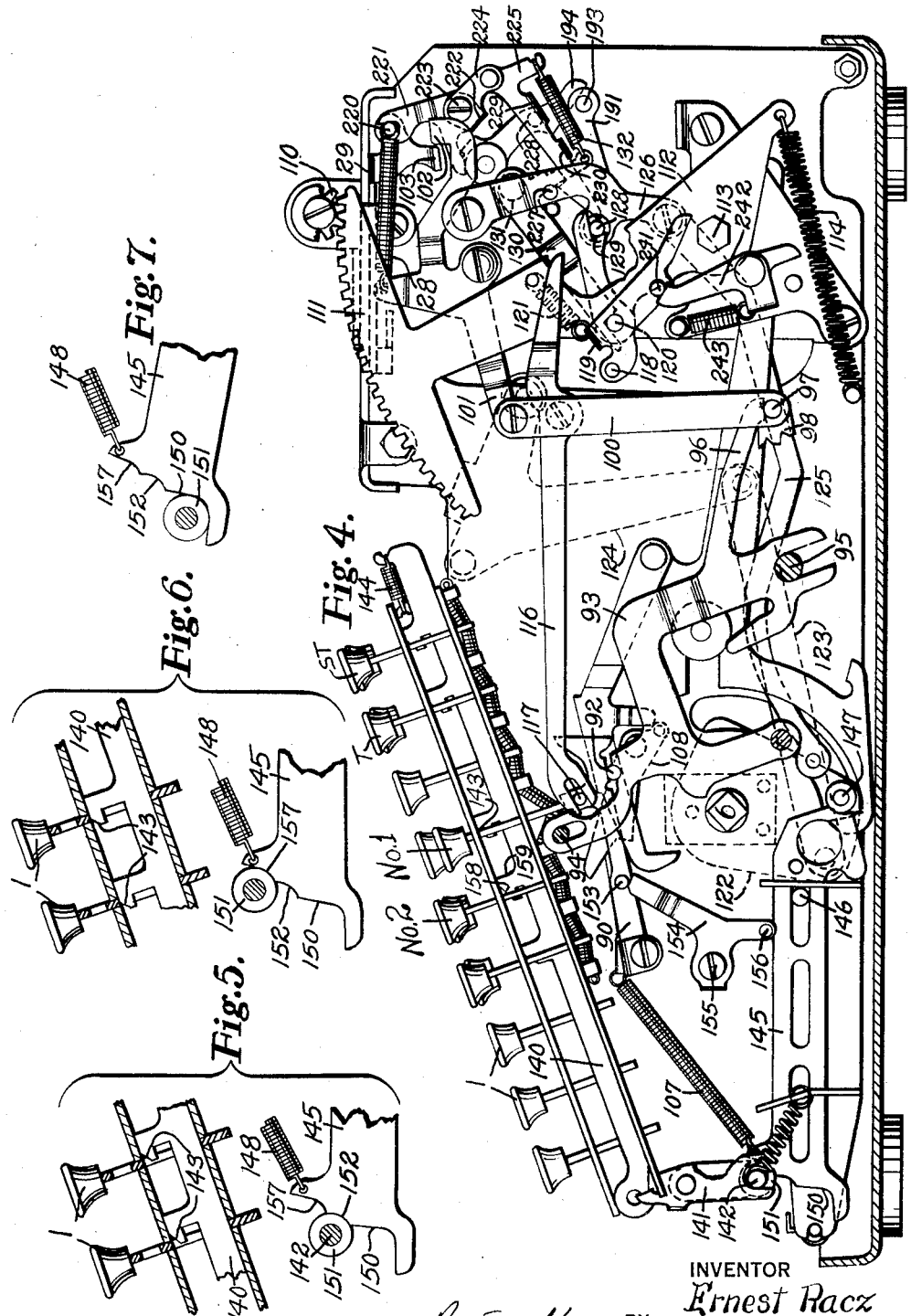
INVENTOR
Ernest Racz
BY Rector, Hibben, Davis, & Macauley
ATTORNEYS May 25, 1937.   E. RACZ   2,081,836
CALCULATING MACHINE
Original Filed Oct. 6, 1932   7 Sheets-Sheet 4
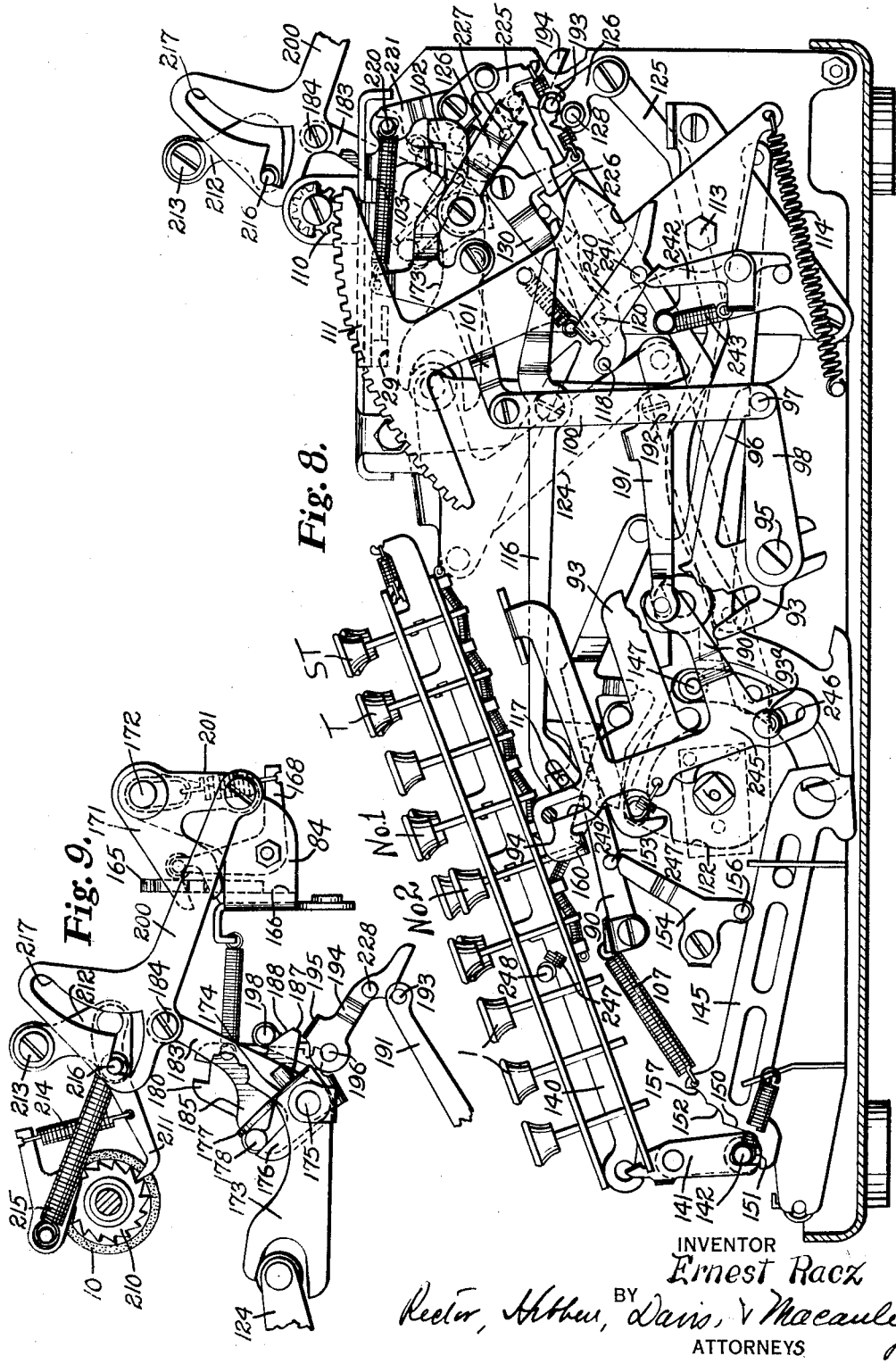
INVENTOR
Ernest Racz
BY Rector, Hibben, Davis, & Macauley
ATTORNEYS May 25, 1937.　　　　E. RACZ　　　　2,081,836
CALCULATING MACHINE
Original Filed Oct. 6, 1932　　7 Sheets-Sheet 5
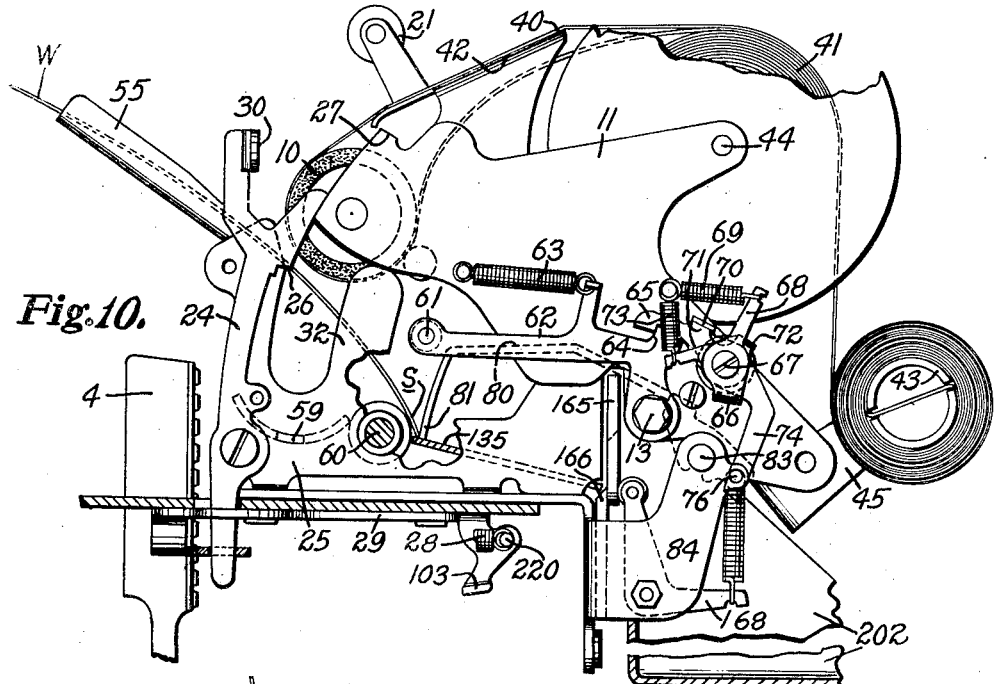
Fig. 10.
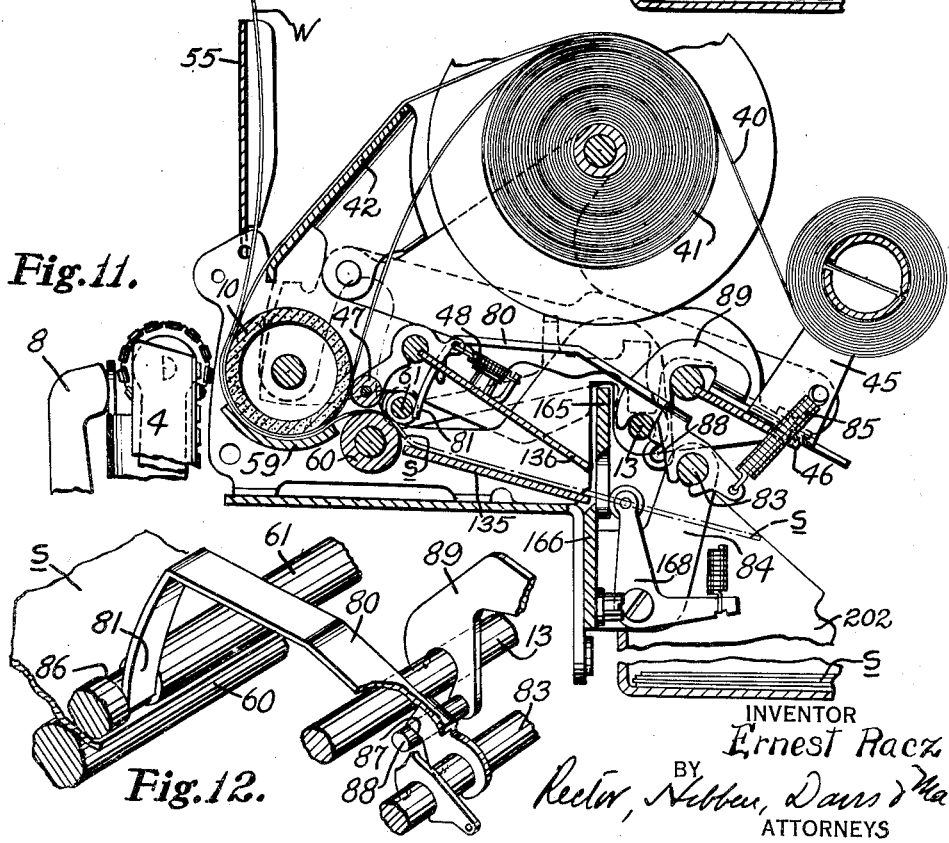
Fig. 11.
Fig. 12.
INVENTOR
Ernest Racz
BY
Rector, Hibben, Davis & Macauley
ATTORNEYS May 25, 1937.  E. RACZ  2,081,836
CALCULATING MACHINE
Original Filed Oct. 6, 1932  7 Sheets-Sheet 6

INVENTOR
Ernest Racz
BY Reeter, Hibben, Davis, Macauley
ATTORNEYS

May 25, 1937.  E. RACZ  2,081,836
CALCULATING MACHINE
Original Filed Oct. 6, 1932   7 Sheets-Sheet 7
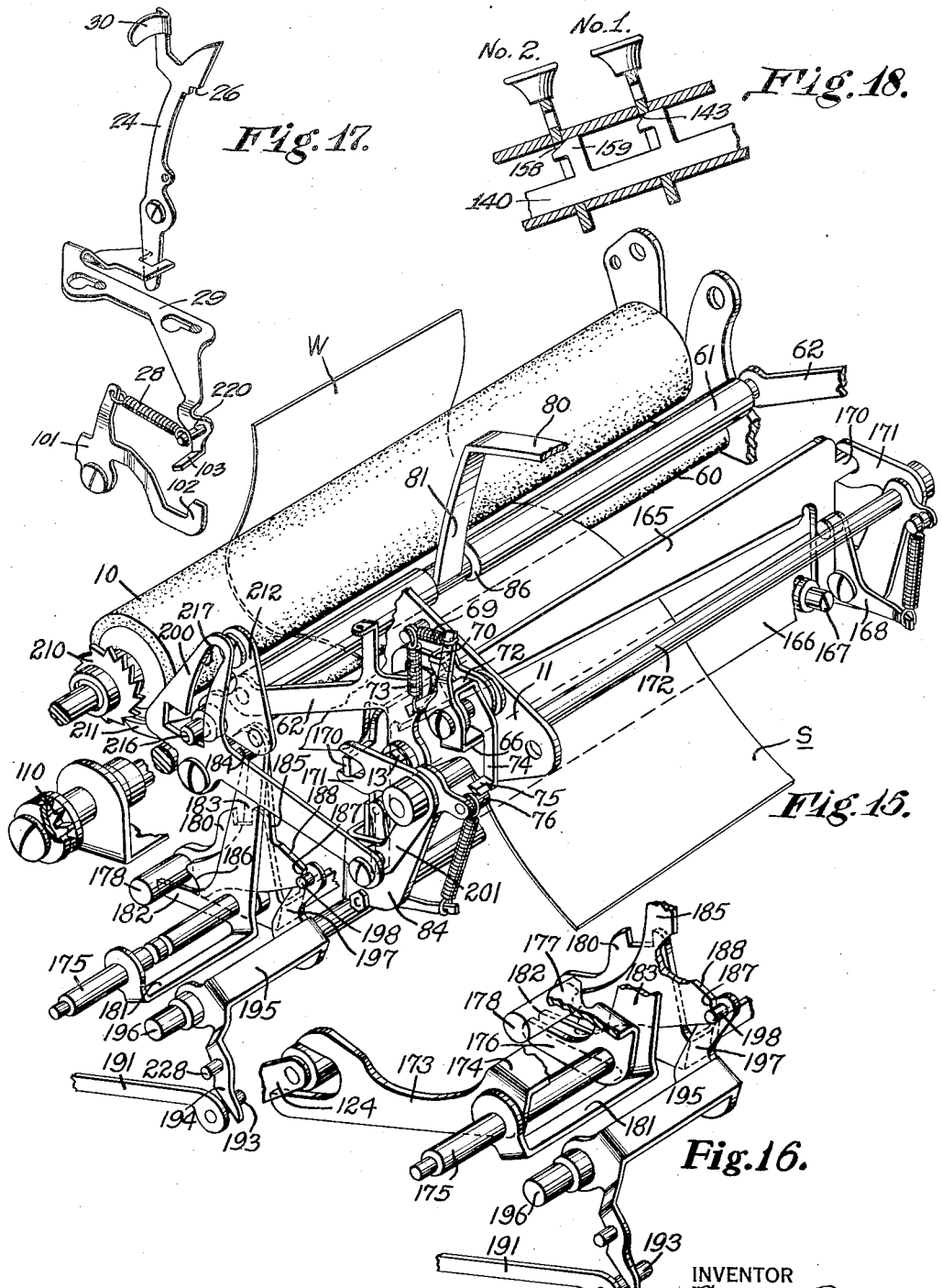
INVENTOR
Ernest Racz
BY
ATTORNEYS Patented May 25, 1937

2,081,836

UNITED STATES PATENT OFFICE 2,081,836

CALCULATING MACHINE

Ernest Racz, Detroit, Mich., assignor to Burroughs Adding Machine Company, Detroit, Mich., a corporation of Michigan Application October 6, 1932, Serial No. 636,465
Renewed November 6, 1936

63 Claims. (Cl. 101—93)

This invention relates to a calculating machine. It is particularly concerned with the paper controlling equipment of a machine of this character but it also relates to certain other features of the machine that operate in predetermined ways in combination with the paper equipment. The machine is sometimes called a "Cash receipting machine" because it is often used to issue receipts for cash payments made by customers of the owner of the machine.

In certain lines of business, for example, in the public utility business, it is desirable, when a customer presents his bill to a cashier for payment in cash, to not only be able to return to the customer a receipted bill, but to also be able to keep a record of the payment. The present invention concerns a machine in which a customer's bill may be quickly and easily inserted into a machine by front feeding it with relation to a platen which, preferably, has a record strip or sheet about it on which a record of all payments is kept. After the bill has been inserted and the platen moved to printing position, the amount of the payment is entered on the keys of the machine and the machine operated, as a result of which the amount of the payment and the date are printed in a portion of the bill, called the "stub". Similar impressions are also made on the record strip. Provision is made for then automatically moving the bill to a second printing position where the amount of the payment is printed on the main or "receipt" portion of the bill and the "stub" on which the printing first occurred is cut off and dropped into a locked container for the use of the manager of the department in checking the cash. During this second operation, the amount of the payment is entered in a register which accumulates the cash receipts for the day. When the machine completes its operation, the "receipt" portion of the bill is automatically released so that the cashier can remove it quickly and hand it to the customer.

At the end of a day, the manager balances the stubs in the locked compartment with the cash received for the day and with the total recorded on the cash receipt register which provides a check on the cash and on the employees. At the same time, the customer receives a receipt on which is recorded mechanically the amount of his payment.

In order to accomplish the above-mentioned results, the machine has been provided with a number of novel features which cooperate in performing the functions mentioned.

The general object of the invention is to provide an improved machine of the general character mentioned.

A more particular object is to provide an improved front-feed mechanism for a machine of the character described.

Another particular object is to provide an improved construction in which a platen is moved to and from printing position, and a "throat" separate from the platen for receiving front-fed sheets is automatically opened and closed as the platen is moved to and from printing position.

Other particular objects are: to provide improved control for the means that holds the front-fed work sheets; to provide an improved automatic stop for arresting the front-fed work sheets in proper position; to provide improved means for feeding the work sheets relative to the platen without disturbing the platen; and to provide an improved autographic feature.

Other objects and advantages of the invention will appear from the following specification and drawings:

An embodiment of the invention is shown in the accompanying drawings in which:—

Figure 1 is a right side elevation of the machine with the parts in position for receiving a front-fed work sheet or bill.

Fig. 2 is a sample bill illustrating how the machine prints the amount of the cash payment on both the stub and the customer's receipt portion of the bill.

Fig. 3 is a right side elevation of the machine with the "No. 1 operating key" depressed and the parts operated to the position they occupy at the end of the first forward stroke of the machine.

Fig. 4 is another right side elevation of the machine showing the parts in the position they occupy after the machine has completed its first operation under the control of the "No. 1 operating key".

Figs. 5, 6, and 7 are detailed partial side elevations showing the key restoring and key locking mechanisms in different positions.

Fig. 8 is another right side elevation of the machine showing the parts in the position they occupy at the end of a forward stroke of operation under the control of the "No. 2 operating key".

Fig. 9 is a partial side elevation showing particularly the operating means for the line spacing and the "cut-off" mechanisms.

Fig. 10 is a partial right side elevation showing particularly the paper equipment, the parts being in the position they occupy to receive a bill or work sheet.

Fig. 11 is a right side elevation similar to Fig. 12 with the parts in the position they occupy after a bill has been inserted and the platen moved to printing position.

Fig. 12 is a detailed perspective view of the limit stop for arresting the bills in proper position as they are inserted in the machine.

Figure 13:
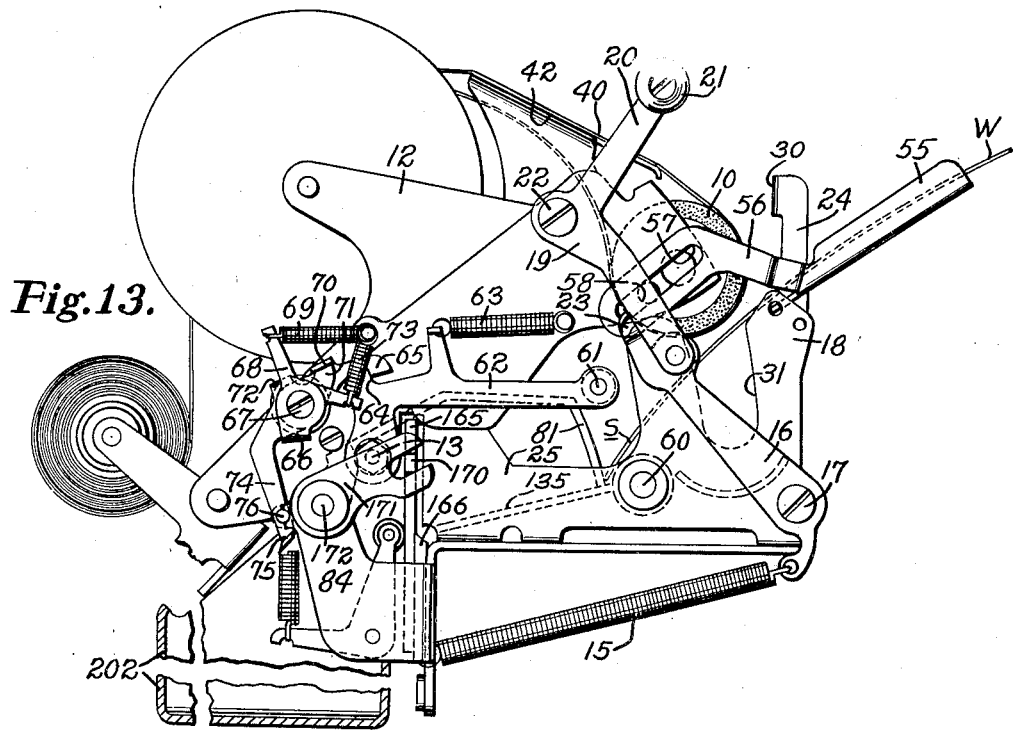

Fig. 13 is a left side elevation of the paper equipment showing the parts in the position they occupy for receiving a bill.

Figure 14:
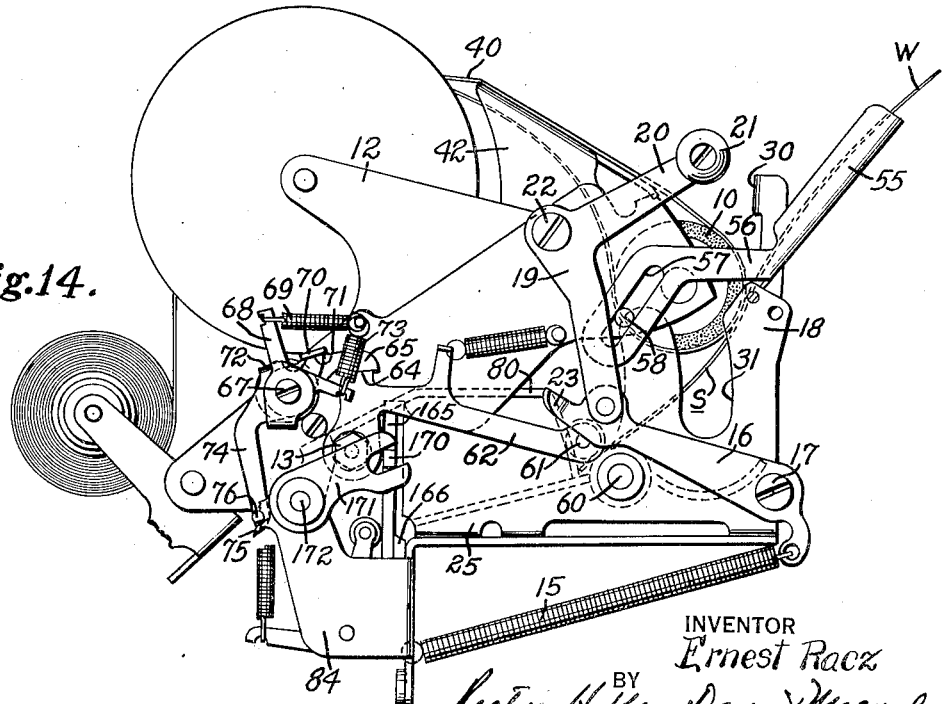

Fig. 14 is a view similar to Fig. 13 with the platen moved down slightly and showing particularly how the bill is held against movement while the platen is being lowered to printing position.

Fig. 15 is a perspective view of a portion of the paper equipment showing particularly the feeding and cutting off mechanism for feeding the bill to a position to have the stub severed from the receipt.

Fig. 16 is a detail perspective view of some of the parts shown in Fig. 15;

Fig. 17 is a detail perspective view of the platen latch and the controls therefor;

Fig. 18 is a detailed side elevation of the latch plate for the "operation" keys.

Fig. 19 is a detailed side elevation of some of the parts controlled by the "No. 1" and the "No. 2" operation keys.

The invention is shown applied to a calculating machine of the type shown in Horton Patent 1,853,050 and known as the "Burroughs Portable". Only such parts of this machine as are more particularly related to the present invention have been illustrated in the drawings and the description of the machine will be made very brief.

The machine has a plurality of banks of depressible amount keys 1 (Fig. 1) which control differential stop bars 2 that are connected to actuator racks 3 which, in turn, have the type bars 4 connected to them. Associated with the actuator racks 3 are one or more registers 5. The machine is provided with a main drive shaft 6 which may be oscillated by means of a handle 7 or by means of a motor, not shown, but illustrated in the Horton patent referred to.

In entering an item, the amount keys are depressed, and the machine is given a forward and return stroke of operation which results in differentially positioning the actuator racks and type bars after which the printing mechanism, including the hammers 8, operates to print the amount. The registers 5 are suitably controlled to engage the actuator racks to add or subtract the amount entered.

A plurality of control keys are provided at the right side of the keyboard, including the total key T and the sub-total key ST and special control keys for the present machine which, for convenience, will be designated as the "No. 1 operating key" and the "No. 2 operating key". The machine operations that take place under control of these keys will be referred to as the "No. 1" and the "No. 2" machine operations. The registers 5 are controlled by the total and subtotal keys in the well-known manner to enable a total and sub-total to be taken from the machine.

The machine is preferably mounted on a cash drawer 9, portions of which are shown in Fig. 1, so that a receptacle for receipt of cash is conveniently available for the operator.

Front feed features

In order that the customer's bill may be quickly and easily inserted into the machine, provision is made for front feeding the bill with reference to the platen without disturbing the record sheet that is held in feeding relation about the platen. A "throat" for receiving front-fed bills or work sheets is provided and this throat is open when the machine is in condition to receive a bill. After the bill is inserted, the throat may be closed and the machine operated. When operations have been completed the throat is automatically opened to permit one work sheet or receipt to be readily removed and another inserted.

These are several features that cooperate in connection with front feeding the bill and, for the sake of convenience, these will be described separately.

Platen mounting

The machine is provided with a platen 10 that is movable to and from printing position relative to the printing mechanism of the machine.

The platen 10 is rotatably mounted in two side plates 11 and 12, the side plate 11 being shown in Fig. 10 and the side plate 12, in Fig. 13. These two side plates are fixed to a cross shaft 13 (Fig. 10) journaled in stationary portions 14 (Fig. 14) of the paper carriage. The two side plates 11 and 12 together with the cross shaft 13 and other cross members which will be mentioned as the description progresses form a "rocking frame" which is movable to move the platen into and out of printing position relative to the printing mechanism heretofore mentioned including the type bars 4 and associated parts.

The rocking frame is urged in a direction to urge the platen out of printing position by a spring 15 (Fig. 14) connected at one end to the stationary plate 14 and, at its other end, to one end of a lever 16 pivoted at 17 to the stationary plate 18. The other end of lever 16 is connected to one arm 19 of a bell crank lever whose other arm 20 carries a handle 21. The bell crank lever 19—20 is pivoted at 22 on the movable side plate 12 of the rocking platen frame. The lever 16 together with the arm 19 form a toggle mechanism and the spring 15 tends to straighten this toggle, the lever 16 being provided with a projection 23 forming a limit stop to arrest the toggle after it has passed slightly over center as shown in Fig. 13. Straightening the toggle results in forcing the rocking platen frame counter-clockwise about its pivot 13, as viewed in Fig. 14, and since the spring 15 tends to straighten the toggle, this spring acts to urge the platen out of printing position. This toggle mechanism also serves to hold the platen out of printing position against accidental return. For example, if pressure is put on the platen tending to return it to printing position from its Fig. 13 position, such pressure is resisted by the toggle, which is over center, and the platen will not move. But, if the operator pulls forward on the handle 21, the toggle will be broken and further pulling on this handle will rock the platen frame downward to move the platen to printing position.

The platen is held in printing position by a releasable latch comprising a pivoted lever 24 (Figs. 10 and 17) pivoted to a stationary plate 25. This lever has a shoulder 26 adapted to engage over the edge of an abutment 27 on the movable side plate 11 of the platen frame. The latch is urged to latching position by a spring 28

(Figs. 1 and 10) that urges a slide plate 29 to the left as viewed in said figures, said slide plate being in engagement with the lower end of latch lever 24. The latch may be manually released by pulling forward on the thumb piece 30 or it may be automatically released during the machine operation as will be later described.

The stationary side plates 18 (Fig. 14) and 25 (Fig. 10) have suitable slots 31 and 32 in them for enabling the platen shaft to move up and down without interference with the plates.

The platen, in moving out of printing position, opens up a space or throat between itself and certain portions of the carriage and the printing mechanism to enable a work sheet to be inserted in substantially horizontal position beneath the platen.

Record sheet mounting

The record sheet shown in the present case is in the form of a narrow continuous strip 40 (Figs. 10 and 11). This strip is fed from a supply roll 41 under the platen 10, up and over an autographic table 42, and back to a storage or take-up reel 43 which is spring urged in a direction to take up the slack in the strip. Both the supply reel 41 and the storage reel 43 are mounted on the rocking frame that supports the platen 10 and move with it, the supply roll being journaled on a cross shaft 44 between side plates 11 and 12 and the storage roll being carried by standards 45 supported by a cross member 46 (Fig. 11) of the rocking platen frame.

The record strip 40 is held in feeding relation to the platen by means of feed rolls 47, of which one is shown in Fig. 11. These feed rolls are urged into engagement with the platen by springs 48.

In order to prevent access to the supply and storage rolls for the record strip an enclosing casing 50 (Fig. 1) is provided and this casing is equipped with a lock 51 controlled by a key 52 so that access to the record strip cannot be had except by the possessor of the key. The housing 50 is, of course, carried by the rocking platen frame.

Line spacing mechanism is provided for the platen in order to feed the record strip from time to time but a description of this mechanism will be deferred until some of the other parts have been described.

Front feed table

A front-feed table is provided for receiving and guiding the work sheets or bills under the platen from the front and with the work sheets inclined slightly but substantially in horizontal position. This table is mounted so that it can be swung to substantially vertical position to move the work sheets around the platen and to hold them in vertical position for printing.

A front-feed table 55 (Fig. 10) is pivoted to the stationary side plates 18 and 25 as shown in Figs. 10 and 14. The table has a rearwardly extending arm 56 (Fig. 14) provided with a slot 57. A stud 58 on the side plate 12 of the rocking platen frame is positioned in this slot.

When the platen is out of printing position, as shown in Figs. 10 and 13, the paper table occupies a substantially horizontal position so that it may serve to receive and guide a work sheet horizontally under the platen from the front and in a convenient position for the sheet to be easily arranged or several sheets to be collated if necessary.

As the platen is moved to printing position, the stud 58, operating in the slot 57, acts to swing the table to a substantially vertical position as illustrated in Fig. 11. As the table swings to vertical position it tends to move the front unfed ends of the work sheet to vertical position and, in so doing, bends the sheet about the platen and holds it above the printing line so that the sheet is held properly for printing.

The platen and the portions of the stationary frame with which it cooperates form what may be called a "front-feed throat" into which work sheets may be fed. When the platen is raised it is in what may be termed "front-feed position" and, at that time, this throat is open. When the platen is moved to printing position the throat is closed.

It should be noted that the handle 21 (Fig. 13), which moves the platen to printing position, also acts, through the platen frame, to swing the paper table 55 to vertical position and, when the platen is moved out of printing position by its spring, the table is automatically moved to a substantially horizontal position.

Work sheet receiving and holding means

One of the features of the present machine is that a separate front feed means for receiving and holding the work sheets is provided which is independent of the platen with the result that the work sheet can be moved relative to the platen and can be received and held in position independently of the platen. This work sheet holding means is movable from closed to "open throat" position and vice versa and it is arranged to be in "open throat" position when the platen is out of printing position with provisions for automatically closing the throat to grip the inserted work sheet as the platen moves to printing position and before the platen moves the work sheet.

The work sheet holding means includes a lower pressure roll 60 (Figs. 11 and 15) journaled in the stationary side plates 18 and 25. Cooperating with the lower roll 60 is an upper pressure roll 61 journaled in the ends of a pair of arms 62, one arm being on one side of the rocking platen frame and the other (Fig. 13) being on the other side of said frame, and both arms being pivoted on the shaft 13. The arms 62 are urged counter-clockwise, as viewed in Fig. 10, about the shaft 13 by springs 63 (Figs. 10 and 13). This urging action is in a direction to cause the upper pressure roll 61 to engage the lower roll 60.

When the platen 10 is out of printing position as shown in Fig. 10, the upper pressure roll 61 is separated from the lower roll 60 so that the "throat" between the rolls is open to receive a front fed work sheet W.

The arms 62 carrying the upper roll 61 are held in the position of Fig. 13 by latches 65 of which there are two, one on each side of the machine (Figs. 10 and 13) but, since they are alike, only one will be described, namely, the one illustrated in Fig. 13.

The arm 62 has a shoulder 64 over which a latch 65 engages. This latch is one arm of a yoke 66 pivoted on a stud 67 on the rocking platen frame. The other arm 68 of this yoke extends upwardly and a spring 69 is provided to urge the yoke clockwise as viewed in Fig. 13 to latched position. The latch 65 has a lateral lug 70 on it and an abutment 71 is positioned to engage this lug. This abutment is one arm of another yoke 72 pivoted on the stud 67. The yoke 72 is urged counter-clockwise by a spring 73 and it has a downwardly projecting arm 74 carrying an inclined lateral lug 75 which is positioned to engage a stationary stud 76 under certain conditions that will be described presently.

As the platen starts to move down toward printing position from the position of Fig. 13, the stud 67 moves with the rocking platen frame about the pivot 13. This moves the arm 74 of yoke 72 upwardly and the upper side of the inclined lug 75 engages the stud 76 which cams the arm 74 and its yoke 72 counter-clockwise. This moves the abutment 71 and the latter lifts latch 65 which releases the arm 62 whereupon the spring 63 rocks the arm clockwise to quickly move the upper pressure roll 61 into engagement with the lower roll 60 to firmly grip and hold the work sheet in position.

This action occurs before the platen engages the work sheet to disturb its position and is illustrated in Fig. 14. In this figure, the platen is shown in contact with the work sheet 25 and the work sheet bent slightly but the pressure rolls 61 and 60 have already engaged the work sheet and such engagement occurred slightly prior to the engagement of the sheet by the platen.

As the platen continues its movement toward printing position, the stud 67 and the parts mounted on it continue to move about the pivot 13. The inclined lug 75 passes the stud 76 and the yoke 72 with its abutment 71 are released for return to normal. When the platen reaches printing position the latch 65 is snapped over the shoulder 64 on the arm 62 by its spring 69 so that the arm 62 is again latched to the rocking platen frame. The spring 69 is stronger than spring 73 so that the latch moves to latching position even though it has to move abutment 71, yoke 72, and arm 74 in so moving.

When the platen is again moved out of printing position, the latch 65 holds the arm 62 so that the latter, together with the feed roll 61 is moved upwardly with the platen and the throat for the front-fed work sheet between rolls 60 and 61 is automatically opened as the platen is raised.

As the platen moves out of printing position, the arm 74 on yoke 72 moves downwardly and the underside of the inclined lug 75 engages the top outside of the stationary stud 76. This cams the yoke 72 clockwise (Fig. 13) and stretches the spring 73 but has no effect upon the latch 65. When the platen reaches its out-of-printing position, the parts occupy the position of Fig. 13 where they are ready for release when the platen is started on its movement toward printing position.

Again, it should be noted that the lever 21, which is used to move the platen to printing position, not only accomplishes this result but, acting through the platen frame, it also releases the mechanism that closes the front-feed throat. It also tilts the paper table as previously mentioned. Another point is that a front-feed throat, which is separate from the platen, is closed automatically prior to the time that the platen engages the work sheet so as to firmly hold the work sheet to prevent it from moving to an inaccurate line-space position as the platen moves to printing position. The pressure rolls 60—61 are prevented from rotating during this time by means which will be hereinafter described. Also, as the platen moves out of printing position, after being released, a throat, which is independent of the platen, is automatically opened.

*Stop for arresting work sheets*

A stop is provided for arresting the front-fed work sheet in proper position as it is inserted in the front-feed throat. This stop is automatically moved out of active position as the platen moves to printing position and after the front-feed throat is closed, provision being made for not moving the stop out of active position until after the front-feed throat has closed to grip the work sheet in the position in which it has been arrested by the stop.

The stop comprises an arm 80 (Fig. 12) having a bent end 81, the arm being pivoted on a shaft 83 carried by stationary brackets 84. The stop 80—81 is urged counterclockwise, as viewed in Fig. 11, by a spring 85. The forward bent end 81 of the stop arm moves through an annular recess 86 (Fig. 12) in the upper pressure roll 61 in order to permit the stop to be positioned closely behind the front-feed throat. It is to be understood, of course, that the arm can be made of any suitable length and can be positioned to arrest the work sheet in any required position suitable for the work for which the machine is built.

The stop arm 80 has a shoulder 87 (Fig. 12) which is positioned for engagement by a stud 88 on an arm 89 fixed to the cross member 46 (Fig. 11) of the rocking platen frame.

As the platen frame is rocked counterclockwise from its Fig. 10 to its Fig. 11 position, the stud 88 engages the shoulder 87 and swings the stop 80—81 upwardly against the tension of spring 85. The parts are proportioned so that this engagement does not take place until after the pressure roll 61 has engaged the pressure roll 60 to grip the work sheet in position. In other words, the rolls 60—61 are moved to "closed throat" position while the stop 80—81 is holding the work sheet in proper line-spaced position, and, after the sheet has been gripped by rolls 60—61, the stop is moved out of the way so as to permit rearward feeding of the work sheet without interference from the stop.

*Control by No. 1 operation key*

After a bill or work sheet has been placed in position and the platen lowered to printing position, the amount of the payment is entered on the amount keys. The "No. 1 operation key" is then depressed. This results in conditioning the machine for operation. The machine may then be operated by means of the handle 7 or by an electric drive which is set into operation by depression of the No. 1 operation key.

Referring to Figs. 3 and 19, the stem of the No. 1 key is positioned so that, when the key is depressed, the stem engages the outer end of a lever 90 pivoted at 91 on a machine side plate. The lever 90 engages a stud 92 on an irregular shaped slide 93 mounted on a stud 94 on a side plate of the machine and on a shaft 95. This slide 93 has a rearwardly extending arm 96 positioned to engage a stud 97 on an arm 98 fixed to the shaft 95 which extends to the opposite side of the machine and controls the motor drive in such a way that, when arm 98 is rocked clockwise the motor is caused to give the machine a stroke of operation. When the No. 1 key is depressed the shaft 95 is rocked clockwise and hence depression of this key serves to cause the motor to give the machine a stroke of operation.

An interlock is provided between the No. 1 key and the platen 10 in order to prevent the key from being fully depressed when the platen is out of printing position and in order to prevent manual release of the platen latch 24 (Fig. 10) during the machine operation after the No. 1 operation key has been depressed with the platen in printing position.

Connected to the rear end of arm 98 is a link 100 having its opposite end connected to one arm of a pivoted bell crank lever 101 urged clockwise by the spring 28 which also urges the slide 29 (Fig. 10) to the left. The bell crank lever 101 has a rearwardly projecting arm 102 which is provided with an upwardly bent rear end positioned for engagement with a lateral lug 103 on the slide 29.

When the No. 1 key is depressed the link 100 is moved downwardly, the bell crank 101 is rocked counter-clockwise, and the bent end of arm 102 moves up to the position of Fig. 3 where it is in the path of the lateral lug 103. If an attempt is made to pull the latch 24 forwardly, which would move the slide 29 rearwardly, the slide is blocked and the platen latch cannot be released. When the No. 1 key is undepressed, the bent end of arm 102 is below the level of lug 103 which permits the platen release latch to be moved. But, if this latch is moved to released position, the lug 103 moves over the bent end of the arm 102 so that the bell crank lever 101 cannot be fully rocked. Accordingly, the No. 1 key cannot be fully depressed while the platen release latch is released.

Depression of the No. 1 key also "non-adds" the machine so that during the first machine operation, the amount of the cash payment is not entered in the register. For this purpose, the stem of the No. 1 key is arranged to engage a shoulder 105 on an arm 106 pivoted at 91 and urged counter-clockwise by a spring 107. This arm has a downwardly projecting end or nose 109 (Fig. 19) positioned to engage a stud on the pawl 108 and disable said pawl. This "non-adds" the machine in the manner described in detail in the Horton patent heretofore referred to.

From the description of the No. 1 key so far given, it will be observed that its depression accomplishes three results, namely (1) it conditions an interlock to prevent platen being released, (2) it places the machine in "non-add" condition, and (3) it causes the motor to give the machine a stroke of operation. Depression of the key also conditions certain other mechanism as will appear from the following description.

Work sheet feeding means

Provision is made for feeding the work sheets rearwardly to a new printing position, and to a position where the stub may be severed from the receipt portion of the sheet. This feeding movement is in a direction opposite to that in which the platen is moved during its line space movements. In fact, the work sheet is moved independently of the platen and while the latter is stationary in its printing position.

An inserted work sheet is fed rearwardly by rotating the pressure rolls 60 and 61 that grip the sheet independently of the platen.

Referring to Figs. 3, 4 and 8, it will be observed that the shaft of the lower pressure roll 60 has a toothed gear 110 fixed to it which meshes with an arcuate rack 111 on the end of an arm 112 pivoted at 113 and urged clockwise (Fig. 3) by a spring 114. During the latter part of the machine operation under control of the No. 1 key the arm 112 is rocked from the position of Fig. 3 so that of Fig. 4 which rotates the lower pressure roll 60 clockwise as viewed in Figs. 3 and 11. At this time the upper pressure roll 61 is pressing the work sheet into engagement with the lower roll and, as the latter is rotated, the work sheet is fed rearwardly to "cut-off" position. During this movement, the work sheet moves relative to the platen 10 but does not disturb the record sheet which is held in position about the platen by the feed rollers 47. The means for rocking the sector arm 112 is conditioned by depression of the No. 1 key as follows:

Pivoted on a stud 115 (Fig. 3) on the side plate of the machine is a lever 116 whose front bifurcated end straddles a stud 117 on the pivoted arm 90 (Fig. 19), which is rocked when the No. 1 key is depressed. The rear end of the lever 116 bears against a stud 118 on one arm of a yoke 119 pivoted at 120 on the sector arm 112 and urged clockwise by a spring 121.

When the No. 1 key is depressed, the lever 116 is rocked counterclockwise which moves the rear end of the lever away from stud 118 and releases the yoke 119 to enable the same to move clockwise under the influence of spring 121 from its Fig. 1 to its Fig. 3 position.

The machine is provided with a main driving cam 122 (Fig. 3) fixed to the drive shaft 6. Connected to this cam is a link 123 which is also connected to a pivoted bell crank lever 124 that operates certain parts of the machine as described in said Horton patent. The link 123 is moved rearwardly during the forward stroke of the machine and returned forwardly during the return stroke.

Pivoted on the link 123 is an irregular shaped link 125 extending rearwardly to where it is pivotally connected to the end of an arm 126 pivoted at 127. This arm carries a stud 128 adapted to engage a shoulder 129 on another arm of the yoke 119.

When the yoke 119 is in the position of Fig. 1, the arm having shoulder 129 on it is above the path of stud 128 and said stud will not engage the shoulder during an operation of the machine. But, when the No. 1 control key is depressed, the yoke 119 moves clockwise to the position of Fig. 3. During the forward stroke of the machine with the No. 1 key depressed, the stud 128 moves rearwardly to its Fig. 3 position, the Fig. 3 position being that at the end of the forward stroke. Upon the return stroke of the machine, the stud 128 moves forward, engages the shoulder 129 and, since the yoke 119 is pivoted to the sector arm 112, moves the sector arm counterclockwise from the position of Fig. 3 to that of Fig. 4. This feeds the work sheet rearwardly to a new printing position and to cut-off position.

It will be appreciated that, during the forward stroke of the next machine operation, the stud 128 will be moved rearwardly again and, if no means were provided to prevent it, the sector arm 112 would return from its Fig. 4 to its Fig. 3 position under the tension of its spring 114. But it is not desired to have the sector returned to this position, as that would return the work sheet forwardly again, whereas, it is desired to retain the work sheet in its rearward position to enable the second printing impression to be made on it and to enable the stub to be cut off.

Accordingly, a latching means is provided for holding the sector in the forward position to which it has been moved during the first machine operation, that is, the operation with the No. 1 key depressed.

As the sector moves to its Fig. 4 position, a bell crank-shaped latch 130 pivoted at 131, and urged counterclockwise by a spring 132, snaps over a stud 133 on the sector arm 112 and latches the sector in the position to which it has been moved. This keeps the work sheet in its rearward position until the latch is released, which occurs automatically near the end of the second machine operation, that is, the operation with the No. 2 key depressed, as will be described later.

It will be observed that, as the work sheet moves rearwardly from the rolls 60 and 61, it passes into a guide chute formed by a lower plate 135 and an upper plate 136 (Fig. 11). The upper plate is carried by the movable platen frame and moves away from the lower plate as the platen moves out of printing position. This opens the chute to permit removal of papers or any obstructions that may accidentally get into it.

Repeat control of keys

As previously mentioned, it is desirable to have the amount keys remain depressed in order to print the amount of the payment a second time and in order to enter it in a register since, during the first machine operation, the machine is non-added.

The calculating machine illustrated is provided with a mechanism, described in said Horton patent, for releasing the amount keys near the end of each machine operation unless the machine is otherwise conditioned. This release is effected as follows:

A latch plate 140 is provided for each bank of keys and each of these latch plates is connected at its forward end to a zero stop 141. These zero stops are controlled by a control rod 142 that extends across the front of the machine. As will be observed from Fig. 4, the zero stops 141 have slots in their ends slightly wider than the diameter of the control rod 142. When a key is depressed, its stem engages a cam face 143 on its latch plate and cams the plate rearward, which slight movement is permitted by a wide slot in the zero stop for that bank. After the key has been depressed, the latch plate moves forward again under the influence of its spring 144 and latches the depressed key in position. All the latch plates are normally released near the end of a machine operation by moving the control rod 142 forward which moves all the latch plates rearward. The control rod is moved forward by means of a sliding and rocking plate 145 which pivots and slides on a stationary stud 146 on the machine frame. The main driving cam 122 has a stud 147 normally engaging the rear end of the slide 145 when the machine is at rest.

During the forward stroke of the machine, the stud 147 moves away from the slide 145, whereupon a spring 107 moves the slide rearwardly and rocks it upwardly, the slide moving about the stud 146 as a pivot. This moves a shoulder 150 immediately to the rear of a roller 151 on the control rod 142. Near the end of the return stroke of the machine, the stud 147 again engages the slide 145 and moves it forwardly. As the slide moves forward, the shoulder 150 moves the control rod 142 forwardly which swings the zero stops forward and moves the latches 140 rearward to release the depressed keys. As the machine operation is completed, the shoulder 150 slides off the roller 151 to its normal position.

The usual manner of preventing the keys from being released is to prevent the slide 145 from swinging upwardly about the stud 146 to the full limit of its movement so that, when it is moved forward during the latter part of the machine operation instead of its shoulder 150 being positioned to the rear of control rod 142, a second shoulder 152 is positioned to the rear of said rod. When the slide 145 is moved forward, the rod 142 is then pushed far enough forward to prevent the keys from being completely locked, but not far enough to release them. In other words, the keys are changed from absolute locked condition to a latched condition. A special control is provided in the present case as follows:

The arm 90, which is moved downward by depression of the No. 1 key, carries a stud 153 positioned above the end of one arm of a bell crank lever 154 pivoted at 155 on a machine side plate. This bell crank lever has a stud 156 adapted to engage the edge of slide 145.

When the No. 1 key is in its raised position shown in Fig. 1, the stud 153 is above the end of the bell crank lever 154 and the latter does not interfere with the normal operation of the slide above described because the bell crank 154 is free to rock when the slide 145 is rocked.

But, when the No. 1 key is depressed, the stud 153 not only moves into engagement with the end of bell crank 154, but it rocks the bell crank to rock the slide 145 counterclockwise slightly past its normal position, namely, from its Fig. 1 to its Fig. 4 position. The forward end of the slide is provided with a third shoulder 157 in this case and this third shoulder is positioned in front of the control rod 142 when the No. 1 key is depressed as above described.

With the parts in this condition (Figs. 4 and 6), the slide 145 is held against rocking about the stud 146 during the operation of the machine. Near the end of the return stroke, the stud 147 engages the end of slide 145 and moves it forwardly, but the shoulder 157 is so constructed that it will not move the control rod with the result that the latch plates for the keys are not moved and the keys remain locked in depressed condition, that is, they remain absolutely locked and cannot be depressed or released.

This locking of the keys also results in locking the No. 1 operation key in depressed condition and, at first glance, it might be thought that this would cause the machine to be given a second stroke of operation because depression of the No. 1 operation key sets the machine into operation. But the parts are proportioned so that, when the No. 1 operation key is released of finger pressure after being depressed, it can move up slightly even though it is locked against full return movement. This upward movement is enough to prevent it from keeping the motor controlling parts in condition for giving the machine a second stroke of operation, with the result that the machine stops after it has been given one stroke.

Referring again to the No. 1 operation key, it will be noted that depression of this key controls five different things as follows:

1. It conditions an interlock for preventing the platen from being released.
2. It places the machine in non-add condition.
3. It conditions the mechanism for enabling the work sheet feeding means to be operated.
4. It conditions mechanism for preventing release of the depressed amount keys so that the item will be repeated.
5. It sets the machine into operation.

No. 2 operation key

In the embodiment of the invention illustrated, the second operation of the machine is initiated by depressing the No. 2 operation key.

At first glance, it might be thought that, at this time, the No. 2 operation key would be locked against depression because, at the end of the operation under control of the No. 1 key, the latch plates for the keys are allowed to remain in locking condition. Provision has been made for enabling the No. 2 operation key to be depressed under these conditions by providing a special cam face 158 on the projection 159 that controls the locking of the No. 2 key. This cam face is cut further back, as shown on Fig. 18. so that, although the plate 140 is in position for locking all the other keys against depression, it does not lock the No. 2 operation key. In other words, the No. 2 operation key is free for depression at all times.

When the No. 2 operation key is depressed, it automatically moves the latch plate 140 for the No. 1 key to released position and releases the No. 1 key so that the controls conditioned by the No. 1 key are removed from the control of said key. This means that the machine returns to "add" condition. Also, the repeat control of the keys is released because the bell crank 154 (Fig. 1) is freed from stud 153 to enable the slide 145 to move normally to release the key latches during the machine operation.

The stem of the No. 2 operation key engages a ledge 160 (Fig. 8) on the slide 245, and moves said slide downwardly so that the upper end of its slot 246 engages the stud 93a on the slide 93, thereby moving the slide 93 downward slightly from the lowered position in which it was held by the No. 1 key after the latter raised slightly when finger pressure on it was released. This downward movement of the slide 245 imparts the slight clockwise movement to the arm 98 necessary to set the machine into operation in the same manner as did the No. 1 operation key. The No. 2 operation key after being fully depressed to start the machine into operation has a slight return upward movement the same as does the No. 1 operation key, so that the machine will make only one operation with the No. 2 key depressed, the same as there was only one machine operation with the No. 1 operation key depressed.

The slide 245 is urged upwardly by a spring 247 connected at one end to the slide 245 and at its other end to a stud 248 projecting from the keyboard section. The slide 245 is guided for up and down movement by a slot 249 engaging the shaft 94 and the slot 246 engaging the stud 93a on the slide 93.

Depression of the No. 2 key also retains in condition the interlock with the platen release lever 24 in the same manner as the No. 1 key heretofore described.

An advantage of this interlock to be noted is that the platen cannot be moved out of printing position and the front feed throat opened until after the machine has been put through the necessary operations. In other words, after the No. 1 operation key has been depressed the platen is locked in printing position and the front feed throat is locked closed. It cannot be opened while the No. 1 key is depressed and it cannot be opened when the No. 2 key is depressed until after the No. 2 machine operation has been completed. This prevents fraudulent alteration of the entries after the No. 1 operation key has been depressed.

Depression of the No. 2 key does not move the arm 106 downwardly to disable the pawl 108 which disablement results in non-adding the machine. Accordingly, during operation of the machine under the control of a No. 2 key, the item on the amount keys is added into the register.

Depression of the No. 2 operation key also conditions for operation the cut-off mechanism which will now be described.

Cut-off mechanism

Means is provided for automatically cutting the stubs from the receipt portion of the work sheets during the second operation of the machine.

Referring to Fig. 15, a movable cutting knife 165 is provided having an inclined cutting edge co-operating with a lower fixed blade 166. The movable knife is guided in its movements by studs 167, of which there is one at each end of the stationary blade 166 and one of which is shown in Fig. 15. These studs prevent endwise movement of the knife and the knife is pressed against the stationary blade by spring urged bell crank arms 168. The ends of the knife have extensions 170 positioned in the bifurcated ends of arms 171 fixed to a rock shaft 172. When this shaft is rocked counterclockwise as viewed in Fig. 15, the blade 165 is moved downward to cut the stub from the receipt portion of the work sheet which has been moved rearward as already described.

The cut-off mechanism is actuated by the operating means of the machine. The link 123 (Fig. 3) which is moved rearwardly during the forward stroke of the machine and returned forwardly during the return stroke, is connected to a bell crank lever 124 as previously mentioned. The bell crank 124 operates an arm 173 (Figs. 8 and 9) which, in the machine of the Horton patent referred to, operates certain portions of the printing mechanism. During each machine operation, the arm 173 is first rocked clockwise (Fig. 9) and then returned counterclockwise. This arm is one part of a yoke 174 pivoted on a stationary machine stud 175 which yoke has two arms 176 and 177 forming a fork engaging over a stud 178 (Figs. 9 and 15) which is carried by an arm 180 of another yoke that operates the printing mechanism as described in said Horton patent. The parts so far described are those used to operate the printing mechanism but, since an understanding of its details is not necessary, no further description will be given here. The point to keep in mind is that the stud 178 which operates the printing mechanism is used to operate the cut-off mechanism as well as the line spacing mechanism for the platen as will now be described.

Pivoted on the stationary shaft 175 (Fig. 15) is a yoke 181 having one arm 182 engaging under the stud 178 and another arm 183 projecting upwardly to where it is pivoted to a stud 184. The stud 184 carries a pendant 185 having a curved notch 186 adapted to engage the stud 178 and a rear cam face comprising a raised portion 187 and an inclined portion 188.

When the parts are in their normal position, and during operation of the machine with the No. 1 operation key depressed, the pendant member occupies the position illustrated in Fig. 15 where, it will be observed, the curved notch 186 does not engage the stud 178. Accordingly, when the stud is rocked clockwise and then returned counterclockwise during a machine operation, the pendant member is not moved.

However, when the No. 2 operation key is depressed, the pendant 185 is rocked to position for engaging the stud 178. This is accomplished through connections from the slide 245 (Fig. 8). The slide 245 has a rear arm 190 connected by a pin and slot connection to one end of a lever 191 pivoted at 192. The rear end of this arm extends upward and carries a stud 193 (Fig. 15) positioned under one arm 194 of a yoke 195 pivoted on a shaft 196 supported by the machine side frames. The other arm 197 of this yoke carries a stud 198 that is adapted to cooperate with the cam faces 187 and 188 on the pendant 185.

When the No. 2 key is depressed, the lever 191 is rocked counterclockwise which raises stud 193, rocks yoke 195 counterclockwise, and swings pendant 185 into engagement with stud 178. Then when the stud 178 is rocked upward, it rocks the pendant 185 together with arm 183 of yoke 181 clockwise about the shaft 175 as a pivot. The stud 178 engaging arm 182 insures that the parts are returned during the return movement of stud 178.

The stud 184 to which the arm 183 of yoke 181 and to which the pendant member 185 are pivoted is secured to a link 200 which extends rearwardly and is connected to an arm 201 that is attached to the rock shaft 172 of the cut-off mechanism. Accordingly, when the machine is operated, the stud 184 and the parts associated with it are rocked which causes a rearward movement of the link 200 and a rocking of the rock shaft 172.

It will thus be clear that, during the second operation of the machine, that is, the operation with the No. 2 operation key depressed, the cut-off mechanism will be automatically operated during the forward stroke of the machine to cut the stub from the receipt portion of the bill, after which the cutting mechanism will be returned to normal during the return stroke.

As the stubs S (Fig. 1) are cut off, they fall into a container 202 (Fig. 1) which is closed by a lid 203 provided with a lock 204 controlled by a key 205. At the end of the day, the manager may take out the stubs and compare their total with the cash in the cash drawer.

*Line spacing mechanism for platen and record sheet*

The platen 10 with which the feed roll 47 cooperates to hold and feed the record sheet, is automatically line spaced during the second operation of the machine, that is, the operation with the No. 2 key depressed.

Referring to Fig. 9, it will be observed that the platen is provided with a toothed ratchet wheel 210 on its end with which cooperates a feed pawl 211 carried by an arm 212 pivoted on a shaft 213 which moves with the platen assembly as the latter moves to and from printing position. The feed pawl 211 is urged into engagement with the ratchet 210 by a spring 214 and the arm 212 carrying the feed pawl is urged clockwise by a spring 215. The arm 212 has a stud 216 operating in an L-shaped slot 217 in the link 200.

During the operation of the machine under control of the No. 1 key, the link 200 is not moved because, as already explained, the pendant 185 (Fig. 15) is in an inactive position. However, during the operation under control of the No. 2 key, the link 200 is first moved rearwardly, or to the right in Fig. 9, and then returned to the left. As the link 200 moves to the right (Fig. 9), the left hand end of the horizontal portion of the slot 217 engages the stud 216 and rocks the arm 212 counterclockwise to pull the feed pawl 211 backward one tooth space against the tension of the spring 215. During the return movement to the left of link 200, the right hand end (Fig. 9) of the horizontal portion of slot 217 engages the stud 216 and pushes the pawl 211 forward to rotate the platen 10 one line space. This line spaces the record sheet independently of the work sheet, because, at this time, the work sheet is held by the pressure rolls 60 and 61.

In this manner the platen is automatically line spaced during the return stroke of the second machine operation, that is, the operation under the control of the No. 2 key.

The line spacing mechanism does not interfere with the movements of the platen to and from printing position. The normal position of the stud 216 in the slot 217 is illustrated in Fig. 15. When the platen is raised, this stud moves in the vertical portion of the slot 217 without affecting the link 200 and, of course, when the platen is returned to printing position the stud returns to the position in Fig. 15.

*Automatic movement of platen to open throat position*

Near the end of the second machine operation, and after the amount of the payment has been printed on the bill and the stub cut off, the platen is automatically moved upward out of printing position to open throat position so that the receipt may be readily removed. The parts are then in position to receive a second work sheet or bill.

It will be recalled that the platen is urged out of printing position by the spring 15 and that, as the platen moves out of printing position, it carries the pressure roll 61 upward to open the throat between the rolls 60 and 61. The platen is normally latched in printing position by the latch 24.

The platen latch 24 may be moved to released position by the slide 29 (Fig. 10). This slide carries a stud 220 (Figs. 4 and 17) positioned in the forked end of the arm 221 of a yoke 222 which is pivoted on a machine stud 223. This yoke has another arm 224 to which is pivoted a latch 225 urged clockwise by the spring 132 which urges latch 130. The latch 225 has a shoulder 226 (Fig. 8) which, under certain conditions, is positioned in the path of a stud 227 on the member 126 that first moves rearwardly and is then returned forwardly during each machine operation. The latch 225 is normally held out of the path of stud 227 by means of a stud 228 (Figs. 7 and 15) on the arm 194 of yoke 195 which, it will be recalled, is under the control of the No. 2 operation key. The stud 228 normally engages a ledge or lateral lug 229 (Fig. 4) on the latch 225 to hold the latch out of the path of the stud 227.

But, when the No. 2 operation key is depressed, the yoke 195 (Fig. 15) is rocked counterclockwise which raises the stud 228 away from the ledge 229 on latch 225. This enables the latch 227 to be moved by its spring so that the shoulder 226 moves into the path of the stud 227 on member 126. During the forward stroke of the second machine operation, the stud 227 moves rearwardly and does not affect the latch 225 but, near the end of the return stroke, the stud 227 engages the shoulder 226 which rocks the yoke 222 clockwise, moves the slide 29 rearwardly and releases the platen latch 24 whereupon the platen automatically moves out of printing position to an open throat position and the pressure rolls 60 and 61 are automatically separated to their open throat position.

It is to be observed that this platen release does not occur until after the line spacing mechanism for the platen has operated to line space the platen so that the stud 212 (Fig. 9) is in the position of Fig. 15 where it may move upwardly in the vertical portion of slot 217.

*Automatic return of work sheet feeding means to normal*

It will be recalled that the pressure rolls 60—61 were rotated by the sector 111 to feed the work sheet rearwardly to a second printing position and to a position where the stub could be cut from the receipt portion of the sheet. It will also be recalled that the sector 111 was latched in position by a latch 130 (Fig. 4) which engaged over a stud 133 on the sector arm 112. Provision is made for automatically releasing the sector 111 to enable it to return to normal under the influence of its spring 114 during which return it rotates the pressure roll 60 in a direction to feed the work sheet forwardly although said sheet is not actually fed forwardly because the release of the sector occurs at the same time that the platen is released and, when the platen is released, the upper pressure roll 61 is moved away from the lower roll 60 so that these rolls do not hold the work sheet in feeding engagement. But this does not hinder the ready removal of the work sheet because the end of the sheet is in position where it may be grasped by the operator.

The sector arm 112 is released by the movement of the latch 225 during the latter part of the return stroke of movement of the machine operation that takes place under the control of the No. 2 key. For this purpose the latch 225 has a lateral lug 230 (Fig. 4) positioned to engage a downwardly extending arm of the latch 130. As the latch 225 is pulled forward by the stud 227, the lug 230 engages the arm on latch 130 and rocks the latch 130 clockwise to release the sector arm which thereupon moves immediately to its normal position under the influence of its spring 114.

In this connection it is to be observed that provision has been made for automatically preventing interference between the stud 128 and the shoulder 129 during the operation under control of the No. 2 key. It will be remembered that the stud 128 moves rearward and returns forward during each machine operation and that, during the return movement under the No. 1 machine operation, stud 128 engages shoulder 129 to move the sector arm 112 to its Fig. 4 position where it is latched by the stud 133 engaging the shoulder of latch 130. The release of this latch takes place during the latter part of the No. 2 machine operation. But, during the latter part of this No. 2 operation, the stud 128 is returning forward and unless prevented, it would block the return of sector arm 112 to normal by engaging shoulder 129.

To prevent this, the yoke 119 on whose arm the shoulder 129 is located, has another arm 240 carrying a stud 241. This stud is positioned to engage the end of a pivoted pawl 242 (Fig. 8) urged clockwise by a spring 243.

As the sector arm 112 with the yoke 119 is rocked to its Fig. 4 position near the end of the return stroke of the No. 1 machine operation, the stud 241 engages the end of pawl 242 and rocks said pawl against the tension of spring 243 to the position of Fig. 4. During the forward stroke of the No. 2 machine operation, the stud 128 moves away from shoulder 129 and frees the yoke 119 whereupon the tension of spring 243 acting through pawl 242, stud 241 and arm 240, rocks the yoke to the position of Fig. 8 where the shoulder 129 is above the path of stud 128. Accordingly, when the sector arm 112 is released as above explained, it can return to normal because shoulder 129 is held above stud 128 long enough to permit the shoulder to pass over the stud.

*Date printing*

Provision is made for the printing of dates on the bill and on the stub by means of a date printing mechanism shown in Fig. 11. An understanding of the details of this mechanism is not necessary for an understanding of the present invention and no description has been considered necessary. Any suitable form of date printing mechanism can be employed.

*Autographic register feature*

Provision is made for enabling the operator to make autographic notations on the record strip opposite various printed entries.

Referring to Figs. 10 and 11, it will be seen that the record strip passes over a flat plate or table 42 positioned above the platen and carried by the platen frame. This table moves with the platen as the latter is moved into and out of printing position.

When the platen is out of printing position the table occupies the position of Fig. 10 where the operator may conveniently write suitable notations on the record strip. Pressure of a pencil on the table does not move the platen toward printing position because the latter is held in its upward position by a toggle mechanism which must be broken by the handle 21 before the platen will move downwardly.

*Using machine as an adding-listing machine*

Although the machine is normally arranged to perform the operations heretofore described, it may also be used as an ordinary adding-listing machine without requiring any changes.

For the purpose of adding-listing work, the following operations are not wanted:
1. Two operations are not desirable.
2. Repeat control of the keys is not wanted.
3. Moving an inserted work sheet rearwardly to cut-off position is not desirable.
4. The platen should not automatically move out of printing position after a machine operation.
5. The front-feed throat should not be automatically opened after a machine operation.

What is wanted is to be able to enter items on the amount keys, and to give the machine a single stroke of operation which will result in printing the items and entering them on a register, the platen and paper remaining in printing position during the printing operation, but being automatically line spaced after each operation.

Provision has been made for enabling adding-listing work to be done by simply depressing the No. 2 operation key instead of the No. 1 operation key. Or, to put it another way, by simply disregarding the No. 1 operation key and using the No. 2 key as a motor bar. The listing may be done on the record strip or on an inserted sheet.

With respect to a single machine operation, it will be recalled that the No. 2 operation key, when depressed, moves a slide 245 (Fig. 8) downwardly. This slide is connected by a stud 94 to the motor control slide 93 so that the latter is moved downwardly when the No. 2 key is depressed whereby the machine is given a stroke of operation. When finger pressure on the No. 2 key is released it moves upwardly slightly and this allows the plate 93 to return far enough so that the machine is given only one stroke of operation.

With respect to the repeat condition of the amount keys, it will be recalled that the No. 2 operation key normally frees or releases the repeat mechanism that has been conditioned by the No. 1 key. Inasmuch as the No. 1 key is not depressed under the conditions now being described, the repeat mechanism will not be set. The No. 2 key will not set it and the amount keys are returned to normal after each machine operation.

As for the rearward feeding of the work sheet to cut-off position, it will be recalled, by referring to the description of the No. 1 operation key, that the mechanism for feeding the work sheet rearwardly is conditioned by depression of the No. 1 key. The No. 1 key must move a lever 116 to condition certain parts so that operation of the machine will actuate the mechanism for feeding the work sheet rearward. But the No. 2 operation key does not move the lever 116, consequently, if a machine operation is initiated by depression of the No. 2 key, the mechanism for moving the work sheet rearwardly will not be conditioned and no such movement of the work sheet will occur.

The automatic release of the platen and associated mechanism, which results in automatically opening the front-feed throat and moving the platen out of printing position, normally operates after a machine operation with the No. 2 operation key depressed. For example, when the No. 2 key is depressed the yoke 195 (Figs. 15 and 16) is rocked to move the stud 228 away from a ledge 229 (Fig. 4) on a latch 225. The latch 225 then moves up so that its shoulder 226 is in the path of a stud 227 on a member 126 that moves forward and then returns rearward during each machine operation. With the parts so conditioned, the latch 225 is moved by stud 227 to release the platen as heretofore described.

But provision has been made to prevent the latch 225 from moving to a position where its shoulder 226 is in the path of the stud 227 when the latch 225 is released by depression of the No. 2 operation key when this key is depressed before the No. 1 operation key has been depressed. When the machine is in normal condition before being operated (Fig. 1) a stud 120, on which the yoke 119 is pivoted, is adjacent the end of the latch 225 as best shown in Fig. 3. This stud 120 is provided with an extension, that is, it is elongated so that it engages over the nose of latch 225, as shown in Fig. 3, and prevents clockwise movement of the latter. This stud 120 is carried by the sector arm 112 that is moved to feed the work sheet rearwardly. But, when the No. 2 key is depressed without the No. 1 key having been previously depressed, this arm 112 is not moved forwardly because, as just explained above, the No. 1 key must be depressed in order to move lever 116 to condition the parts to cause the sector arm 112 to be moved. Consequently, the stud 120 does not move away from the latch 125 when the No. 2 key is depressed and the latch 225 is prevented from moving clockwise when the stud 228 releases it upon depression of the No. 2 key. This means that the shoulder 226 is not in the path of the stud 227 and, consequently, the latch 225 will not be pulled by the stud to release the platen.

Line spacing occurs automatically when the No. 2 key is depressed in a manner heretofore described, that is, the line spacing mechanism is enabled and, during the latter part of the machine operation upon depression of the No. 2 key, the platen is rotated a step. During this line spacing movement the cut-off mechanism operates but this is an idle operation since the work sheet has not been moved rearwardly.

From the above it will be seen that, due to the particular arrangement, combination, and construction of the parts, the machine can be used as an ordinary adding-listing machine by simply using the No. 2 key as a motor bar. This is a very decided advantage because it provides a machine that is capable of performing the "cash receipting" operations heretofore described and yet, at the same time, it can be used as an ordinary adding-listing machine without requiring any additions or changes.

Operation

Although the operation of the machine should be clear from the description heretofore given, a brief résumé will be made.

Under normal conditions, the platen 10 is out of printing position, as illustrated in Figs. 1 and 10 and the pressure rolls 60 and 61 are in "open-throat" position so that a work sheet may be readily inserted in the machine. Also, under normal conditions, the record strip is about the platen ready to receive the various entries that are made on the individual work sheets.

The operator inserts a work sheet in the machine, which is an easy operation as the front-feed throats are open, the paper table is in a position to guide the sheet horizontally under the platen, and the stop 80—81 is in position to arrest the sheet in proper position. Having inserted the sheet the operator pulls the handle 21 forward which moves the platen toward printing position. As this happens the throat between rolls 60—61 is automatically closed to grip the work sheet and this gripping takes place prior to the engagement of the platen with the work sheet. This holds the work sheet firmly in position as the platen moves to printing position. When the platen reaches printing position it is latched by the latch 24 and, during the platen movement, the stop 80—81 for arresting the work sheet has been automatically moved to inactive position so that the work sheet can be fed rearwardly during operation of the machine.

The No. 1 operation key is then depressed which causes the machine to be given a stroke of operation. Depression of this key places the machine in "non-add" condition, it conditions the "repeat" mechanism for keeping the amount key depressed, it conditions an interlock with the platen, and it conditions the mechanism that controls the feeding action of the work sheet pressure rolls 60—61.

During the "No. 1" operation of the machine, the amount entered on the keys is printed on the bill or work sheet and reproduced on the record strip. Near the end of this machine operation, and after printing has occurred, the sector arm 112 is rocked and the pressure roll 60 is rotated to move the work sheet to a new printing position and to a position where the stub may be cut from the receipt. This movement is independent of the platen and in a direction opposite to the line spacing movements of the platen. After the machine has completed its operation it stops.

The operator then depresses the No. 2 key which causes a second or "No. 2" operation. Depression of the No. 2 key releases the No. 1 key; it leaves the machine in addition condition; it releases the "repeat" mechanism so that, at the end of the No. 2 operation, the keys are released; it conditions the interlock with the platen; and it conditions the parts so that, during the machine operation, the cut-off mechanism is automatically operated and the platen is line spaced to move the record strip while the work sheet is held. Depression of this key also conditions certain parts so that, during the latter part of this second machine operation, the platen is automatically released and the sector 111 is automatically released to return to normal. During the No. 2 operation the printing mechanism operates to print the payment a second time, but, this time, the amount is printed on the receipt. The relative location of the two imprints is shown by the entry "Jan. 15 $2.50 Pd" on the work sheet as illustrated in Fig. 2. During the second printing operation the amount is again reproduced on the record sheet but, since this sheet is not line spaced until after the second printing operation, the second impression is over the first so that only one impression appears on the record sheet. This double printing on the record sheet makes a better impression than would a single imprint. The record sheet thus contains a very clear record.

When the platen is released it automatically moves out of printing position to open-throat position and, at the same time, automatically opens the throat between the pressure rolls 60 and 61. This frees the work sheet for ready removal and enables another to be inserted.

It is to be understood that the structure shown is for purposes of illustration and that variations may be made in it without departing from the spirit and scope of the invention as defined by the appended claims.

I claim:

1. In a machine of the class described, a printing mechanism, a platen, means cooperating with said platen to form a holding means for holding work sheets in printing position relative to said printing mechanism, said holding means being movable from closed to open throat position and vice versa, a second work sheet holding means independent of said platen for receiving and holding said work sheets, said independent work sheet holding means being movable from closed to open throat position and vice versa, and means operable to simultaneously move both of said holding means to open throat position.

2. In a machine of the class described, a printing mechanism, a platen, means cooperating with said platen to form a holding means for holding work sheets in printing position relative to said printing mechanism, said holding means being movable from closed to open throat position and vice versa, a second holding means independent of said platen for receiving and holding said work sheets, said independent work sheet holding means being movable from closed to open throat position and vice versa, and means acting automatically during a predetermined machine operation to move both of said holding means to open throat position.

3. In a machine of the class described, a printing mechanism, a platen, means cooperating with said platen to form a holding means for holding work sheets in printing position relative to said printing mechanism, said holding means being movable from closed to open throat position and vice versa, a second holding means independent of said platen for receiving and holding said work sheets, said independent work sheet holding means being movable from closed to open throat position and vice versa, and means for moving both of said work sheet holding means to closed throat position, said first work sheet holding means having connections for controlling the movement of said independent work sheet holding means to closed throat position.

4. In a machine of the class described, a printing mechanism, a platen, means cooperating with said platen to form a holding means for holding work sheets in printing position relative to said printing mechanism, said holding means being movable from open to closed throat position and vice versa, a second work sheet holding means independent of said platen for holding said work sheets, said independent work sheet holding means being movable from closed to open throat position and vice versa, and a single means operable to move both of said work sheet holding means to closed throat position.

5. In a machine of the class described, a printing mechanism, a platen, means cooperating with said platen to form a holding means for holding work sheets in printing position relative to said printing mechanism, said holding means being movable from closed to open throat position and vice versa, a second work sheet holding means independent of said platen for holding said work sheets, said independent work sheet holding means being movable from closed to open throat position and vice versa, and means operable by a single lever for moving both of said work sheet holding means to closed throat position.

6. In a machine of the class described, a printing mechanism, a platen, means cooperating with said platen to form a holding means for holding work sheets in printing position relative to said printing mechanism, said holding means being movable from closed to open throat position and vice versa, a second work sheet holding means independent of said platen for holding said work sheets, said independent work sheet holding means being movable from closed to open throat position and vice versa, and means for moving both of said work sheet holding means to closed throat position including portions operable to cause one of said work sheet holding means to be moved to closed throat position prior to the other to enable the inserted work sheet to be held by said closed holding means to prevent it being disturbed by said other holding means.

7. In a machine of the class described, a printing mechanism, a platen, means cooperating with said platen to form a holding means for holding work sheets in printing position relative to said printing mechanism, said holding means being movable from closed to open throat position and vice versa between said platen and said work sheet holding means, a second work sheet holding means independent of said platen for holding said work sheets, said independent work sheet holding means being movable from closed to open throat position and vice versa, means for moving said work sheet holding means from open to closed throat position, and means controlled by said first named work sheet holding means as it moves to closed throat position for causing said independent work sheet holding means to be moved to closed throat position prior to said first work sheet holding means.

8. In a machine of the class described, a printing mechanism, a platen movable from printing position relative to said printing mechanism to a front-feed position and vice versa, means for holding a record sheet about said platen so that said sheet will move with said platen as the latter is moved from printing to front-feed position and vice versa, means independent of said platen for receiving and holding work sheets, said work sheet holding means being movable from closed to open throat position and vice versa, means for moving said platen to front-feed position, and mechanism acting automatically, as said platen is moved out of printing position, to move said independent work sheet holding means to open throat position.

9. In a machine of the class described, a printing mechanism, a platen movable from printing position relative to said printing mechanism to a front feed position and vice versa, means for holding a record sheet about said platen so that said sheet will move with the platen as the latter is moved from printing to front-feed position and vice versa, means separate from said platen for receiving and holding work sheets, said work sheet holding means being movable from closed to open throat position and vice versa, and means acting automatically during a predetermined operation of said machine for moving said platen to front-feed position and simultaneously moving said separate work sheet holding means to open throat position.

10. In a machine of the class described, a printing mechanism, a platen movable from printing position relative to said printing mechanism to a front-feed position and vice versa, means for holding a record sheet about said platen so that said sheet will move with said platen as the latter is moved from printing to front-feed position and vice versa, means independent of said platen for receiving and holding work sheets, said work sheet holding means being movable from closed to open throat position and vice versa, means for moving said platen to front-feed position, and connections operated by said platen as the latter is moved out of printing position for moving said independent work sheet holding means to open throat position.

11. In a machine of the class described, a printing mechanism, a platen movable from printing position relative to said printing mechanism to front-feed position and vice versa, means for holding a record sheet about said platen so that said sheet will move with said platen as the latter is moved from printing to front-feed position and vice versa, a set of pressure rolls independent of said platen for receiving and holding work sheets, means for moving said platen from printing to front-feed position, and connections between said platen and one of said pressure rolls for separating said roll from its companion roll as the platen is moved out of printing position.

12. In a machine of the class described, a printing mechanism, a platen movable from printing position relative to said printing mechanism to front-feed position and vice versa, means independent of said platen for receiving and holding work sheets, said means being movable from closed to open throat position and vice versa and being in open throat position when said platen is in front-feed position, and means for moving said platen from front-feed to printing position and said independent work sheet holding means to closed throat position.

13. In a machine of the class described, a printing mechanism, a platen movable from printing position relative to said printing mechanism to a front-feed position and vice versa, means for holding a record sheet about said platen so that said sheet will move with said platen as the latter is moved from printing to front-feed position and vice versa, means independent of said platen for receiving and holding work sheets, said work sheet holding means being movable from closed to open throat position and vice versa and being in open throat position when said platen is in front-feed position, and means operable by a single lever for moving said platen to printing position and said independent work sheet holding means to closed throat position.

14. In a machine of the class described, a printing mechanism, a platen movable from printing position relative to said printing mechanism to a front-feed position and vice versa, means independent of said platen for receiving and holding work sheets, said means being movable from closed to open throat position and vice versa and being in open throat position when said platen is in front-feed position, and means operable to move said platen to printing position and said work sheet holding means to closed throat position, said last named means including portions acting to move said independent work sheet holding means to closed throat position to grip the inserted work sheet prior to movement of said work sheet by said platen as it moves to printing position.

15. In a machine of the class described, a printing mechanism, a platen movable from printing position relative to said printing mechanism to a front-feed position and vice versa, means independent of said platen for receiving and holding work sheets, said means being movable from closed to open throat position and vice versa and being in open throat position when said platen is in front-feed position, means for moving said platen to printing position, and means controlled by the movement of said platen toward printing position for causing said independent work sheet holding means to be automatically moved to closed throat position.

16. In a machine of the class described, a printing mechanism, a platen movable from printing position relative to said printing mechanism to a front-feed position and vice versa, means independent of said platen for receiving and holding work sheets, said means being movable from closed to open throat position and vice versa, means urging said work sheet holding means to closed throat position, a latch for holding said work sheet holding means in open throat position, and means for moving said platen to printing position and for releasing said latch.

17. In a machine of the class described, a printing mechanism, a platen movable from printing position relative to said printing mechanism to a front-feed position and vice versa, means independent of said platen for receiving and holding work sheets, said means being movable from closed to open throat position and vice versa and being in open throat position when said platen is in front-feed position, means urging said work sheet holding means to closed throat position, a latching device for holding said work sheet holding means in open throat position, and means for moving said platen to printing position and for releasing said latching device with provisions for releasing said device to enable said work sheet holding means to grip the inserted work sheet prior to movement of said work sheet by said platen as the latter moves to printing position.

18. In a machine of the class described, a printing mechanism, a platen movable from printing position relative to said printing mechanism to a front-feed position and vice versa, means independent of said platen for receiving and holding work sheets, said work sheet holding means being movable from closed to open throat position and vice versa and being in open throat position when said platen is in front-feed position, means urging said work sheet holding means toward closed throat position, a latching device holding said work sheet holding means in open throat position, means for moving the platen toward printing position, and means actuated by said platen as it moves to printing position for releasing said latching device.

19. In a machine of the class described, a printing mechanism, a platen movable from printing position relative to said printing mechanism to a front-feed position and vice versa, a set of pressure rolls independent of said platen for receiving and holding work sheets, one of said feed rolls being movable away from the other to open and close the throat between them, means urging said movable pressure roll toward its companion roll, a latch for holding said movable roll in open throat position when moved to such position, and means controlled by said platen as it moves to printing position for releasing said latch.

20. In a front-feed machine of the class described, a printing mechanism, a platen, means cooperating with said platen to form a holding means for holding front-fed work sheets in printing position relative to said printing mechanism, said holding means being movable from closed to open throat position and vice versa, a second work sheet holding means independent of said platen for receiving said front-fed work sheets, said independent holding means being movable from closed to open throat position and vice versa, means for moving both of said holding means to open-throat position, means for receiving and guiding work sheets into both of said throats from the front while they are open, and means for closing both of said throats.

21. In a front-feed machine of the class described, a printing mechanism, a platen, means cooperating with said platen to form a holding means for holding front-fed work sheets in printing position relative to said printing mechanism, said holding means being movable from closed to open throat position and vice versa, a second work sheet holding means independent of said platen for holding said work sheets, said independent work sheet holding means being movable from closed to open throat position and vice versa, means for moving both of said holding means to open throat position, means for receiving and guiding work sheets from the front into both of said throats while they are open, and means for closing both of said throats including provisions for closing one of said throats prior to the other to enable the inserted work sheet to be gripped by said closed throat to prevent it being disturbed by the closing of said second throat.

22. In a front-feed machine of the class described, a printing mechanism, a platen movable from printing position relative to said printing mechanism to a front-feed position and vice versa, a front-feed means independent of said platen for receiving front-fed work sheets, said front-feed means being movable from closed to open throat position and vice versa, means for moving said platen from printing to front-feed position, means acting automatically as said platen is moved out of printing position to move said independent front-feed means to open throat position, means for guiding a work sheet under said platen from the front and into the open throat of said front-feed means while said platen is in front-feed position, and means for moving said front-feed means to closed throat position and said platen to printing position.

23. In a front-feed machine of the class described, a printing mechanism, a platen movable from printing position relative to said printing mechanism to front-feed position and vice versa, a set of front-feed pressure rolls independent of said platen for receiving front-fed work sheets, said front-feed pressure rolls being movable from closed to open throat position and vice versa, means for moving said platen from printing to front-feed position, means acting automatically as said platen is moved out of printing position to separate said front-feed rolls to open the throat between them, means for guiding a work sheet under said platen from the front and between said pressure rolls while said platen is in front-feed position, and means for moving said pressure rolls to closed throat position and said platen to printing position.

24. In a front-feed machine of the class described, a printing mechanism, a platen movable from printing position relative to said printing mechanism to front-feed position and vice versa, front-feed means independent of said platen for receiving and holding front-fed work sheets, said front-feed means being movable from closed to open throat position and vice versa, and means controlled by a single lever for moving said platen from printing to front-feed position and simultaneously moving said independent front-feed means to open-throat position.

25. In a front-feed machine of the class described, a printing mechanism, a platen movable from printing position relative to said printing mechanism to front-feed position and vice versa, a set of front-feed pressure rolls independent of said platen for receiving front-fed work sheets, one of said rolls being mounted to move with said platen as the latter moves out of printing position, means for moving said platen from printing to front-feed position, means causing said movable pressure roll to move with said platen as the latter moves out of printing position to thereby open the throat between said rolls to receive front-fed work sheets, means for guiding a work sheet under said platen from the front and into said open throat while the platen is out of printing position, and means for moving said movable pressure roll to closed throat position and said platen to printing position.

26. In a front-feed machine of the class described, a printing mechanism, a platen movable from printing position relative to said printing mechanism to front-feed position and vice versa, front-feed means independent of said platen for receiving work sheets, said independent front-feed means being movable from closed to open throat position and vice versa and being in open throat position when said platen is in front-feed position, a pivoted paper table in front of said platen for guiding work sheets substantially horizontally under said platen from the front while the latter is in front-feed position and said throat is open, and means for moving said platen to printing position, for moving said independent front-feed means to closed throat position, and for moving said paper table to a substantially vertical position.

27. In a front-feed machine of the class described, a printing mechanism, a platen movable from printing position relative to said printing mechanism to front-feed position and vice versa, means independent of said platen for receiving and holding front-fed work sheets, said front-feed means being movable from closed to open throat position and vice versa, a pivoted paper table in front of said platen occupying a substantially vertical position when said platen is in printing position, means operable to move said platen from printing to front-feed position and to simultaneously move said independent front-feed means to open throat position and said paper table to substantially horizontal position whereby the inserted work sheet may be removed and another inserted substantially horizontally under said platen and into said open throat from the front, and means for moving said front-feed means to closed throat position, said platen to printing position, and said paper table to substantially vertical position.

28. In a front-feed machine of the class described, a printing mechanism, a platen movable from printing position relative to said printing mechanism to front-feed position and vice versa, front-feed means independent of said platen for receiving and holding front-fed work sheets, said independent front-feed means being movable from closed to open throat position and vice versa, and means acting automatically during a predetermined operation of said machine to move said platen from printing to front-feed position and simultaneously move said independent front-feed means to open throat position.

29. In a front-feed machine of the class described, a printing mechanism, a platen movable from printing position relative to said printing mechanism to front-feed position and vice versa, a set of front-feed pressure rolls independent of said platen, one of said pressure rolls being urged toward the other but being movable away therefrom as the platen is moved out of printing position to open the throat between said front-feed rolls, means holding said movable roll in open throat position when moved thereto, means for guiding a work sheet under said platen from the front and between said pressure rolls when said platen is in front-feed position, means for moving said platen to printing position, and means acting automatically as said platen is moved toward printing position for releasing said movable pressure roll to enable the same to move to closed throat position as said platen moves to printing position.

30. In a front-feed machine of the class described, a printing mechanism, a platen movable from printing position relative to said printing mechanism to front-feed position and vice versa, front-feed means independent of said platen for receiving and holding front-fed work sheets, said independent front-feed means being movable from closed to open throat position and vice versa and being in open throat position when said platen is in front-feed position, means for guiding a work sheet under said platen from the front and into said open throat while said platen is in front-feed position, and means operable by a single lever for moving said platen to printing position and simultaneously moving said independent front-feed means to closed throat position.

31. In a front-feed machine of the class described, a printing mechanism, a platen movable from printing position relative to said printing mechanism to front feed position and vice versa, front-feed means independent of said platen for receiving and holding front-fed work sheets, said independent front-feed means being movable from closed to open throat position and vice versa and being in open throat position when said platen is in front feed position, means for guiding a work sheet under said platen from the front and into said open throat while said platen is in front-feed position, and mechanism for moving said independent front-feed means to closed throat position and said platen to printing position, said mechanism having portions operating to close said independent front-feed throat to grip the inserted work sheet prior to movement of said work sheet by said platen as the latter moves to printing position.

32. In a front-feed machine of the class described, a printing mechanism, a platen movable from printing position relative to said printing mechanism to front feed position and vice versa, means for holding a record sheet about said platen so that said sheet will move with said platen as the latter moves from printing to front-feed position and vice versa, front-feed means independent of said platen for receiving and holding front-fed work sheets, said independent front-feed means being movable from closed to open throat position and vice versa, means for moving said platen with its record sheet from printing to front-fed position and simultaneously moving said front-feed means to open throat position, means for guiding a work sheet under said platen from the front and into said open throat, and mechanism for returning said platen to printing position and for closing said front-feed throat, said mechanism having portions acting to close said throat to grip said inserted work sheet prior to movement of said sheet by said platen as the latter moves to printing position.

33. In a front-feed machine of the class described, a printing mechanism, a platen movable from printing position relative to said printing mechanism to front-feed position and vice versa and adapted to receive a record sheet, front-feed means independent of said platen for receiving and holding front-fed work sheets, said independent front-feed means being movable from closed to open throat position and vice versa and being in open throat position when said platen is in front feed position, a paper table in front of said platen for guiding a work sheet horizontally from the front under said platen and into said open throat, and mechanism for moving said work sheet holding means to closed throat position and said platen to printing position, said mechanism including portions operating to close said throat to hold said inserted work sheet prior to movement of said work sheet by said platen as the latter moves to printing position.

34. In a front-feed machine of the class described, a printing mechanism, a platen movable from printing position relative to said printing mechanism to front-feed position and vice versa, front-feed means independent of said platen for receiving and holding front-fed work sheets, said front-feed means being movable from closed to open throat position and vice versa and being in open throat position when said platen is in front feed position, means for moving said platen to printing position, and mechanism operated automatically by the movement of said platen to printing position for causing said independent front-feed means to move to closed throat position prior to movement of the inserted work sheet by said platen.

35. In a front-feed machine of the class described, a printing mechanism, a platen carried by a frame which is rockable to rock said platen from printing position relative to said printing mechanism to front-feed position and vice versa, a front-feed pressure roll pivotally mounted on said frame and cooperating with another pressure roll independent of said platen to form a front-feed throat for receiving and holding front-fed work sheets, said pressure roll on said rocking frame being urged toward said cooperating roll but being moved out of engagement therewith when said platen frame is rocked to a position to hold said platen in front feed position, means for guiding a work sheet under said platen from the front and between said rolls while said platen is in front-feed position, means for moving said platen frame to move said platen to printing position, and mechanism operable as said frame is rocked to release said movable roll to enable it to move into engagement with its cooperating roll to close said front-feed throat to hold the inserted work sheet as the platen moves to printing position.

36. In a front-feed machine of the class described, an operating means for giving said machine cycles of operation, a platen adapted to receive a record sheet, front-feed means independent of said platen for gripping and holding a front-fed work sheet in printing position relative to said platen, said front-feed means being movable from closed to open throat position and vice versa, means acting automatically during a predetermined cycle of machine operation to automatically move said independent front-feed means from closed to open throat position, means for guiding a work sheet under said platen from the front and into said throat while the latter is open, and means for moving said front-feed means to closed throat position.

37. In a front-feed machine of the class described, a platen adapted to receive a record sheet, means for guiding work sheets under said platen from the front, front-feed means independent of said platen for holding said work sheets in printing position relative to said platen, said front-feed means being movable from closed to open throat position and vice versa, means for urging said front-feed means to open-throat position, restraining means for holding said front-feed means in closed-throat position, and mechanism acting to automatically release said restraining means during a predetermined operation of the machine.

38. In a front-feed machine of the class described, a machine operating means, a platen adapted to receive a record sheet, means for guiding work sheets under said platen from the front, front-feed means for holding said work sheets in printing position relative to said platen, said front-feed means being movable from closed to open-throat position and vice versa, means for urging said front-feed means to open-throat position, restraining means for holding said front-feed means in closed-throat position, and means actuated by said machine operating means for automatically releasing said restraining means during a predetermined operation of said operating means.

39. In a front-feed machine of the class described, a machine operating means, a printing mechanism, a platen movable from printing position relative to said printing mechanism to front-feed position and vice versa and adapted to receive a record sheet, means urging said platen out of printing position, restraining means for holding the platen in printing position, and means actuated automatically by said machine operating means during a predetermined operation of said machine to release said restraining means to enable said platen and its record sheet to move from printing to front-feed position.

40. In a front-feed machine of the class described adapted to be given cycles of operation, a printing mechanism, a platen movable from printing position relative to said printing mechanism to a front-feed position and vice versa and adapted to receive a record sheet, means urging said platen out of printing position, restraining means for holding the platen in printing position, special control means settable to condition said machine for two special cycles of operation one of which may be initiated after the other, means conditioned during the first cycle to condition the machine for the second cycle, means acting during said first cycle to prevent release of said restraining means, and mechanism acting automatically during the second of said cycles to release said restraining means to enable said platen to move from printing to front-feed position.

41. In a machine of the class described, a printing mechanism, a platen movable to and from printing position relative to said printing mechanism, means for urging said platen away from printing position, a toggle mechanism for holding said platen out of printing position after it has been moved to such position, and a manipulative member for breaking said toggle mechanism and moving said platen to printing position.

42. In a front-feed machine of the class described, a platen adapted to receive a record sheet, front-feed means for receiving and holding front-fed work sheets, said front-feed means being movable from closed to open throat position and vice versa, means for guiding a work sheet into the open throat of said front-feed means from the front, a movable stop for arresting said inserted work sheet in a predetermined position, and means for moving said front-feed means to closed throat position and automatically moving said stop to inactive position after said front-feed means has gripped the inserted work sheet.

43. In a front-feed machine of the class described, a printing mechanism, a platen movable from printing position relative to said printing mechanism to front-feed position and vice versa, front-feed means for receiving and holding front-fed work sheets, said front-feed means being movable from closed to open throat position and vice versa and being in open-throat position when said platen is in front-feed position, means for guiding a work sheet substantially horizontally under said platen from the front while it is in front-feed position, a movable stop at the rear of said platen for arresting said inserted work sheet in a predetermined position, and mechanism operable to move said front-feed means to closed-throat position to grip said work sheet and to subsequently move said platen to printing position, said mechanism including portions acting to automatically move said stop to inactive position after said front-feed means has been moved to closed-throat position.

44. In a front-feed machine of the class described, a printing mechanism, a platen movable from printing position relative to said printing mechanism to front-feed position and vice versa, front-feed means independent of said platen for receiving and holding front-fed work sheets, said front-feed means being movable from closed to open throat position and vice versa and being in open throat position when said platen is in front-feed position, means for guiding a work sheet under said platen from the front and into the open throat of said front-feed means when said platen is in front-feed position, a movable stop for arresting the inserted work sheet in a predetermined position, and mechanism operable to move said front-feed means to closed-throat position, to move said platen to printing position, and to move said stop to inactive position, said mechanism having portions causing said front-feed means to grip said work sheet prior to the movement of said stop and prior to movement of said work sheet by said platen.

45. In a machine of the class described, a printing mechanism, a platen carried by a frame which is rockable to move said platen from printing position relative to said printing mechanism to a front-feed position and vice versa, front-feed means for receiving and holding front-fed work sheets, said front-feed means being movable from closed to open throat position and vice versa and being in open-throat position when said platen is in front-feed position, means for guiding a work sheet under said platen from the front and into the open throat of said front-feed means while said platen is in front-feed position, a movable stop for arresting the inserted work sheet in a predetermined position, and means controlled by said rockable frame for moving said front-feed means to closed throat position and said stop to inactive position as said frame is rocked to move the platen to printing position, said frame controlled means acting to close said front-feed throat prior to the movement of said stop and prior to movement of said work sheet by said platen.

46. In a front-feed machine of the class described, a platen, means for holding a record sheet in feeding relation about said platen, means for line spacing said platen in a given direction, means for guiding a work sheet under said platen from the front, a front-feed means for receiving and holding said front-fed work sheet in printing position relative to said platen, and means acting automatically during a machine operation to move said front-fed work sheet to a new printing position in a direction opposite to the line space movements of said platen.

47. In a front-feed machine of the class described, a platen, means for holding a record sheet about said platen in feeding relation thereto, means for line spacing said platen in a given direction, means for guiding a work sheet under said platen from the front, means independent of said platen for receiving and holding said front-fed work sheet in printing position relative to said platen, and means operating automatically during a machine operation to move said work sheet to a new printing position in a direction opposite to the line space movements of said platen.

48. In a front-feed machine of the class described, a platen, means for holding a record sheet about said platen in feeding relation thereto, means for line spacing said platen in a given direction, means for guiding a work sheet under said platen from the front, means independent of said platen for receiving and holding said front-fed work sheet in printing relation to said platen, and means operating automatically during a machine operation to actuate said independent work sheet holding means to cause it to move said work sheet to a new printing position in a direction opposite to the line space movements of said platen.

49. In a front-feed machine of the class described, a platen, means for holding a record sheet about said platen in feeding relation thereto, means for line spacing said platen in a given direction, means for guiding a work sheet under said platen from the front, a set of rotatable pressure rolls independent of said platen for receiving and holding said front-fed work sheet in printing relation to said platen, and means acting automatically during a machine operation to rotate said separate set of pressure rolls to move said front-fed work sheet to a new printing position in a direction opposite to the line space movements of said platen.

50. In a front-feed machine of the class described, a printing mechanism, a platen movable from printing position relative to a printing mechanism to front-feed position and vice-versa, means for holding a record sheet about said platen in feeding relation thereto, means for line spacing said platen in a given direction, front-feed means for receiving and holding a front-fed work sheet, said front-feed means being movable from closed to open throat position and vice versa and being in open throat position when said platen is in front-feed position, means for guiding a work sheet under said platen from the front while said platen is in front-feed position, means for moving said front-feed means to closed throat position and said platen to printing position, and means operating automatically during a machine operation and while said platen is in printing position to move said work sheet relative to said platen to a new printing position in a direction opposite to the line space movements of said platen.

51. In a front-feed machine of the class described adapted to be given cycles of operation, a printing mechanism, a platen, means for holding a record strip about said platen in feeding relation thereto, front-feed means for receiving and holding a work sheet in front-fed printing position relative to said platen, means for causing a cycle of operation of said machine during which said printing mechanism is operated, means operating automatically after said printing mechanism has operated during said cycle to move said front-fed work sheet to a new printing position, means conditioned during said first cycle of operation to condition said machine for a second cycle of operation, means for causing a second cycle of operation of said machine during which said printing mechanism is operated, means operating automatically after said printing mechanism has operated a second time to sever the portion of said front-fed sheet on which the first printing impression occurs from the position on which the second impression occurs, means automatically line spacing said platen after said second printing operation to move said record sheet relative to said work sheet, and means acting automatically to free said work sheet after the above-mentioned operations have taken place to permit the remaining portion of the inserted work sheet to be readily removed and another work sheet inserted.

52. In a front-feed machine of the class described, a printing mechanism, a platen, means for holding a record sheet about said platen in feeding relation thereto, a front-feed means for receiving and holding a work sheet in front-fed printing position relative to said platen so that when said printing mechanism operates the impressions may be duplicated on said record strip by a suitable duplicating medium, said front-feed means being movable from closed to open throat position and vice versa, means for causing a cycle of operation of said machine during which said printing mechanism is operated, means acting automatically after said printing mechanism has operated during said cycle to move said work sheet relative to said platen to a new printing position, means conditioned during said cycle of operation to condition said machine for a second cycle of operation, means for causing a second cycle of operation of said machine during which said printing mechanism is operated, means operating automatically after said second printing operation to cut off the portion of said work sheet on which the first printing impression occurred, means for automatically line spacing said platen relative to said work sheet, and means acting automatically after the above-mentioned operations have taken place for moving said front-feed means to open-throat position to permit the remaining portion of the work sheet to be readily removed and another work sheet inserted.

53. In a front-feed machine of the class described adapted to be given cycles of operation, a printing mechanism, a platen, means for holding a record sheet about said platen in feeding relation thereto, front-feed means for receiving and holding a work sheet in front-fed printing position relative to said platen, said front-feed means being movable from open to closed throat position and vice versa, means for moving said work sheet to a new printing position relative to said platen, means for conditioning the machine to cause a cycle of operation thereof during which said printing mechanism operates after which said work sheet is automatically moved to a new printing position, means operating during said first cycle to condition said machine for a second cycle of operation, means for conditioning said machine for a second cycle of operation, means operating during said second cycle of machine operation to cut off a portion of said work sheet and to line space said platen relative to said work sheet, and means acting automatically during the latter part of said second cycle of machine operation to move said front-feed means to open throat position to permit the remaining portion of said work sheet to be readily removed and another work sheet inserted.

54. In a front-feed machine of the class described adapted to be given cycles of operation, a printing mechanism, a platen movable from printing position relative to said printing mechanism to front-feed position and vice versa, means for holding a record sheet about said platen in feeding relation thereto, front-feed means for receiving and holding a work sheet in printing position relative to said platen, said front-feed means being movable from closed to open-throat position and vice versa, means for guiding a work sheet under said platen horizontally from the front and into said front-feed throat while said platen is in front-feed position, means for moving said platen to printing position and closing said front-feed throat, means for giving said machine a cycle of operation, means acting automatically during said cycle of machine operation, and after said printing mechanism has operated, to move said front-fed work sheet relative to said platen to a new printing position where it is held by said front-feed means for a second cycle of machine operation during which said printing mechanism is operated, means conditioned during said first cycle to condition said machine for a second cycle of operation, means for causing a second cycle of operation during which said printing mechanism is operated, means acting automatically after said second operation of said printing mechanism to cut off a portion of said work sheet, means for subsequently line spacing said platen to move said record strip, and means acting automatically after the above mentioned operations have taken place to move said front-feed means to open throat position and said platen out of printing position to enable the remainder of said work sheet to be readily removed and another work sheet inserted.

55. In a front-feed machine of the class described, a printing mechanism, a platen, means for holding a record sheet about said platen in feeding relation thereto, a front-feed means for receiving and holding a front-fed work sheet in printing position relative to said platen so that when said printing mechanism operates the printing impression may be duplicated through a suitable duplicating medium on said record sheet, and means acting automatically during a predetermined machine operation to move said front-fed work sheet to a new printing position while said platen and record sheet remain in their original position so that, when said printing mechanism again operates to print on said front-fed sheet, the impression will be duplicated on said record sheet at exactly the same place as was the first impression.

56. In a front-feed machine of the class described, a printing mechanism, a platen, means for line spacing said platen in a given direction, a front-feed means for receiving and holding a front-fed work sheet in printing position relative to said platen so that when said printing mechanism operates to print on said work sheet the impression may be duplicated by a suitable duplicating medium on said record sheet, and means acting automatically during a predetermined machine operation to move said front-fed sheet in a direction opposite to the line space movements of said platen while said platen and record sheets remain in their original position relative to said printing mechanism whereby, when said printing mechanism is operated a second time, the impressions on said work sheet will be duplicated on said record sheet in exactly the same place as the first printing impression.

57. In a machine of the class described, a motor drive, a plurality of depressible keys, a control key operable to condition said machine to perform certain functions and to cause said motor drive to operate said machine, means acting, upon depression of said control key and operation of said machine, to lock all the keys except a second control key, said first control key being mounted to enable it, when released, to move slightly under the influence of an urging means to a position to release said motor drive to cause the machine operation to stop but to a position that does not change the functions for which the machine was conditioned by said control key, and a second control key for releasing the first key and for conditioning the machine to perform certain other functions and for causing a machine operation, said second control key conditioning the machine so that upon operation thereof all the keys are released and the machine returns to normal.

58. A front-feed machine of the class described having means for giving it cycles of operation, a printing mechanism normally operated at a predetermined time during a cycle of machine operation, front-feed means for gripping a front-feed work sheet and holding it in front-fed printing position relative to a platen, said front-feed means being movable from closed to open throat position and vice versa, means for guiding a work sheet into said throat from the front while said throat is open, means for closing said throat prior to a cycle of operation of said machine, means for opening said throat, and means conditioned by a predetermined cycle of machine operation for causing said throat-opening means to automatically open said throat during the succeeding cycle of machine operation and after said printing mechanism has operated during said succeeding cycle.

59. In a front-feed machine of the class described, operating means for giving the machine cycles of operation, a platen adapted to receive a record sheet, means for guiding a work sheet under said platen from the front, front-feed means for gripping said work sheet, said front-feed means being movable from closed to open-throat position and vice versa, special control means settable to condition said machine for two special cycles of operation one of which may be initiated after the other, means conditioned during the first cycle to condition the machine for the second cycle, means acting during the first cycle of operation to prevent said front-feed means from being moved to open-throat position, and mechanism acting automatically during the second of said cycles of operation to automatically move said front-feed means to open-throat position.

60. A machine of the class described adapted to be given cycles of operation, amount keys, a calculating mechanism, a printing mechanism, a platen adapted to receive a record sheet and provided with means for line spacing it, front-feed means for receiving an inserted work sheet, said front-feed means being movable from closed to open-throat position and vice versa, machine conditioning means including manipulative portions which, when manipulated in one manner, condition the machine to compel it, when operated, in order that it may again reach normal condition, to be operated through two cycles of operation one of which conditions the machine for the other and at the end of which said front-feed means is moved to open-throat position, said machine conditioning means being operable, when manipulated in another manner, to enable said machine to operate through single cycles of operation as an adding-listing machine with the front-feed throat remaining closed and the platen automatically line spaced.

61. A machine of the class described adapted to be given cycles of operation, amount keys, a calculating mechanism, a printing mechanism, a platen adapted to receive a record sheet and having line spacing means, front-feed means for receiving an inserted work sheet, said front-feed means being movable from closed to open-throat position and vice versa, two special control keys each adapted, when depressed, to cause a cycle of operation of said machine, and machine conditioning means controlled by said keys so that, when one of them is depressed first, the machine is given a cycle of operation and placed in condition for a second cycle that can be initiated only by said second key, and at the end of which said front-feed means is automatically moved to open-throat position, said machine conditioning means being operable when said second key is depressed first and alone to cause said machine to operate through single cycles of operation as an adding-listing machine with said front-feed throat remaining closed and said line spacing mechanism operable.

62. A machine of the class described adapted to be given cycles of operation, amount keys, calculating mechanism, printing mechanism, a platen having means for line spacing it and adapted to receive a record sheet, front-feed means for receiving work sheets, said front-feed means being movable from closed to open-throat position and vice versa, paper-severing mechanism, and special control means including manipulative portions which, when manipulated in one manner, cause the machine to go through two cycles of operation one of which may be initiated after the other and during which an item entered on said amount keys is printed on an inserted work sheet, said sheet is moved to severing position, the severing mechanism is operated, said platen is line spaced, said item is printed a second time at a different place on said work sheet, and said front-feed means is automatically moved to open-throat position, said special conditioning means being operable, when manipulated in another manner, to cause said machine to go through a single cycle of operation during which the machine operates as an adding-listing machine with the front-feed throat remaining closed and with the line spacing mechanism operable to line space the platen during each cycle of machine operation.

63. A machine of the class described adapted to be given cycles of operation, amount keys, calculating mechanism, printing mechanism, a platen including means for line spacing it and adapted to receive a record sheet, front-feed means for receiving an inserted work sheet, said front-feed means being movable from closed to open-throat position and vice versa, paper-severing mechanism, a first and a second control key each operable to cause a cycle of operation of the machine, means controlled by said control keys operating, when said first control key is depressed first and said second control key is subsequently depressed after a cycle of machine operation caused by the first key, to cause said machine to first print on an inserted work sheet an item entered on said amount keys, to move said work sheet to severing position, to sever said sheet, to line space said platen, to print said item a second time on said work sheet, and to automatically move said front-feed means to open-throat position, said control means being operable when said second control key is depressed first and by itself, to cause said machine to operate as an adding-listing machine with the front-feed means remaining closed and the platen line spaced after each cycle of machine operation.

ERNEST RACZ.